United States Patent [19]
Landwehr et al.

[11] Patent Number: 5,688,422
[45] Date of Patent: Nov. 18, 1997

[54] PROGRAMMABLE FAN CONTROL METHOD AND APPARATUS FOR USE IN A FOOD OVEN

[75] Inventors: Tim A. Landwehr, West Alexandria; Gary L. Mercer, Eaton, both of Ohio

[73] Assignee: Henny Penny Corporation, Eaton, Ohio

[21] Appl. No.: 430,718

[22] Filed: Apr. 28, 1995

[51] Int. Cl.⁶ ........................................................ H05B 1/02
[52] U.S. Cl. ........................... 219/491; 219/491; 219/494; 219/497; 219/412; 236/46 F
[58] Field of Search ..................... 219/483, 486, 219/481, 491, 494, 497, 501, 506, 411–413; 236/46 F

[56] References Cited

U.S. PATENT DOCUMENTS

| | | |
|---|---|---|
| 3,353,004 | 11/1967 | Alexander . |
| 3,364,338 | 1/1968 | Holtkamp . |
| 3,751,632 | 8/1973 | Kauranen . |
| 3,855,452 | 12/1974 | Flasza et al. . |
| 4,065,659 | 12/1977 | Yount et al. . |
| 4,158,432 | 6/1979 | van Bavel . |
| 4,188,520 | 2/1980 | Dills . |
| 4,227,062 | 10/1980 | Payne et al. . |
| 4,238,669 | 12/1980 | Huntley . |
| 4,316,068 | 2/1982 | Tanabe . |
| 4,316,078 | 2/1982 | Mack et al. . |
| 4,379,964 | 4/1983 | Kanazawa et al. . |
| 4,396,817 | 8/1983 | Eck et al. . |
| 4,410,795 | 10/1983 | Ueda . |
| 4,441,015 | 4/1984 | Eichelberger et al. . |
| 4,447,692 | 5/1984 | Mierzwinski . |
| 4,454,501 | 6/1984 | Butts . |
| 4,467,184 | 8/1984 | Loessel . |
| 4,496,827 | 1/1985 | Sturdevant . |
| 4,538,049 | 8/1985 | Ryckman, Jr. . |
| 4,554,437 | 11/1985 | Wagner et al. . |
| 4,561,348 | 12/1985 | Halters et al. . |
| 4,568,810 | 2/1986 | Carmean . |
| 4,575,616 | 3/1986 | Bergendal . |
| 4,633,065 | 12/1986 | Takazume et al. . |
| 4,634,843 | 1/1987 | Payne . |
| 4,678,432 | 7/1987 | Teraoka . |
| 4,700,685 | 10/1987 | Miller . |
| 4,723,068 | 2/1988 | Kusuda . |
| 4,761,539 | 8/1988 | Carmean . |
| 4,780,597 | 10/1988 | Linhart et al. . |
| 4,831,225 | 5/1989 | Ishifuro et al. . |
| 4,849,597 | 7/1989 | Waigand . |
| 4,856,286 | 8/1989 | Sulfstede et al. ................... 62/89 |
| 4,862,225 | 8/1989 | Heiller et al. . |
| 4,899,034 | 2/1990 | Kadwell et al. . |
| 4,914,277 | 4/1990 | Guerin et al. . |
| 4,918,293 | 4/1990 | McGeorge . |
| 4,920,252 | 4/1990 | Yoshino . |
| 4,920,948 | 5/1990 | Koether et al. . |
| 4,924,073 | 5/1990 | Chiba . |
| 4,943,706 | 7/1990 | Lyall et al. . |
| 4,962,299 | 10/1990 | Duborper et al. . |
| 4,994,652 | 2/1991 | Wolf et al. . |
| 5,044,262 | 9/1991 | Burkett et al. . |
| 5,080,087 | 1/1992 | McFadden et al. . |
| 5,111,028 | 5/1992 | Lee . |
| 5,140,120 | 8/1992 | Kasai et al. . |
| 5,171,974 | 12/1992 | Koether et al. . |
| 5,182,439 | 1/1993 | Burkett et al. . |
| 5,296,683 | 3/1994 | Burkett et al. . |
| 5,317,130 | 5/1994 | Burkett et al. . |
| 5,361,686 | 11/1994 | Koopman . |

FOREIGN PATENT DOCUMENTS 0220119  10/1986  European Pat. Off. .

*Primary Examiner*—Mark H. Paschall
*Attorney, Agent, or Firm*—Baker & Botts, L.L.P.

[57] ABSTRACT

A cooking device for cooking food comprising a cavity, a heating element disposed in the cavity, a temperature sensor for determining the temperature in the cooking device and a fan operable in at least three modes, an OFF mode, a HI mode and a LO mode to move air in the cooking device. A fan control device is provided to operate the fan in LO mode by pulsing the fan on for a first predetermined mount of time every second predetermined amount of time to ensure continuous movement of the fan.

12 Claims, 18 Drawing Sheets

PROGRAMMABLE FAN CONTROL METHOD AND APPARATUS FOR USE IN A FOOD OVEN

CROSS-REFERENCES TO RELATED APPLICATIONS

This application is a related to U.S. application Ser. No. 08/020,848 entitled "PROGRAMMABLE LOAD COMPENSATION METHOD AND APPARATUS FOR USE IN A FOOD OVEN," now pending, which is a continuation-in-part of U.S. application Ser. No. 07/746,910 filed Aug. 19, 1991 entitled "PROGRAMMABLE LOAD COMPENSATION METHOD AND APPARATUS FOR USE IN A FOOD OVEN," which is now U.S. Pat. No. 5,317,138 and which is related by subject matter to commonly owned applications entitled "PREHEATING METHOD AND APPARATUS FOR USE IN A FOOD OVEN," Ser. No. 07/746,760 filed Aug. 19, 1991, now U.S. Pat. No. 5,296,683, and to "METHOD AND APPARATUS FOR OPERATING A FOOD OVEN," Ser. No. 07/748,200 filed Aug. 19, 1991, now U.S. Pat. No. 5,182,439. This application is related by subject matter to application Ser. No. 08/020,935 entitled "ROTISSERIE OVEN," which is pending and which is a continuation-in-part of application Ser. No. 07/973,037 filed entitled "ROTISSERIE OVEN" now U.S. Pat. No. 5,361,686.

REFERENCE TO MICROFICHE APPENDICES

Source code for the process performed by the present invention in a preferred embodiment is contained in the grand-parent application Ser. No. 07/746,910, now U.S. Pat. No. 5,317,138, in 224 flames on 4 microfiche, in the microfiche appendix. An additional Microfiche Appendix B containing 398 pages of source code is incorporated by reference.

BACKGROUND OF THE INVENTION

1. Field of the Invention

This invention relates generally to the field of food ovens. More specifically, the present invention is directed to a food oven having a fan for circulating air in the food oven cooking cavity and for cooling control components.

2. Description of the Problem

Today, restaurants find it increasingly more desirable to efficiently cook food in order to provide fast service and to reduce the labor costs involved in the cooking process. Efficiency means that a particular food item is cooked in a short time and with minimal interaction required from an operator while not sacrificing food quality. Due to the temperature at which these ovens operate, proper cooling of the control components is required. Further, food items may not be served immediately after preparation and must be held in the cooking chamber temporarily.

SUMMARY OF THE INVENTION

These and other problems of the prior art are solved by the present invention. The present invention provides for control of the air circulation in the cooking chamber to ensure proper cooking of food in the oven and proper cooling of control components. A low-speed fan is provided which continuously generates air movement without continuously using power. This feature is effected by pulsing the fan on for a first predetermined time period every second predetermined time period. The fan is powered off during the rest of the second predetermined time period. The inertial movement of the fan blades causes the blades to continue to rotate. The blades slow due to friction. Before the blades stop rotating, the fan is again pulsed on. Preferably the first and second predetermined time periods are selected such that the fan blades turn at a slow, relatively constant speed.

Accordingly, one embodiment of the present invention comprises a cooking device for cooking food. The cooking device comprises a cavity, a heating element disposed in the cavity, a temperature sensor for determining the temperature in the cooking device and a fan operable in at least three modes, an OFF mode, a HI mode and a LO mode to move air in the cooking device. A fan control device is provided to operate the fan in LO mode by pulsing the fan on for a first predetermined amount of time every second predetermined amount of time to ensure continuous movement of the fan.

The above descriptions of the present invention provide only a broad overview of preferred embodiments within the present invention. The details of certain aspects of the present invention will be more fully understood from the following specification and drawings.

DETAILED DESCRIPTION

The present invention preferably embodies a hardware controller which performs various functions on the oven. The hardware for the controller will first be described, with the functions and steps performed by the hardware described thereafter.

Hardware Description

Figure 1:
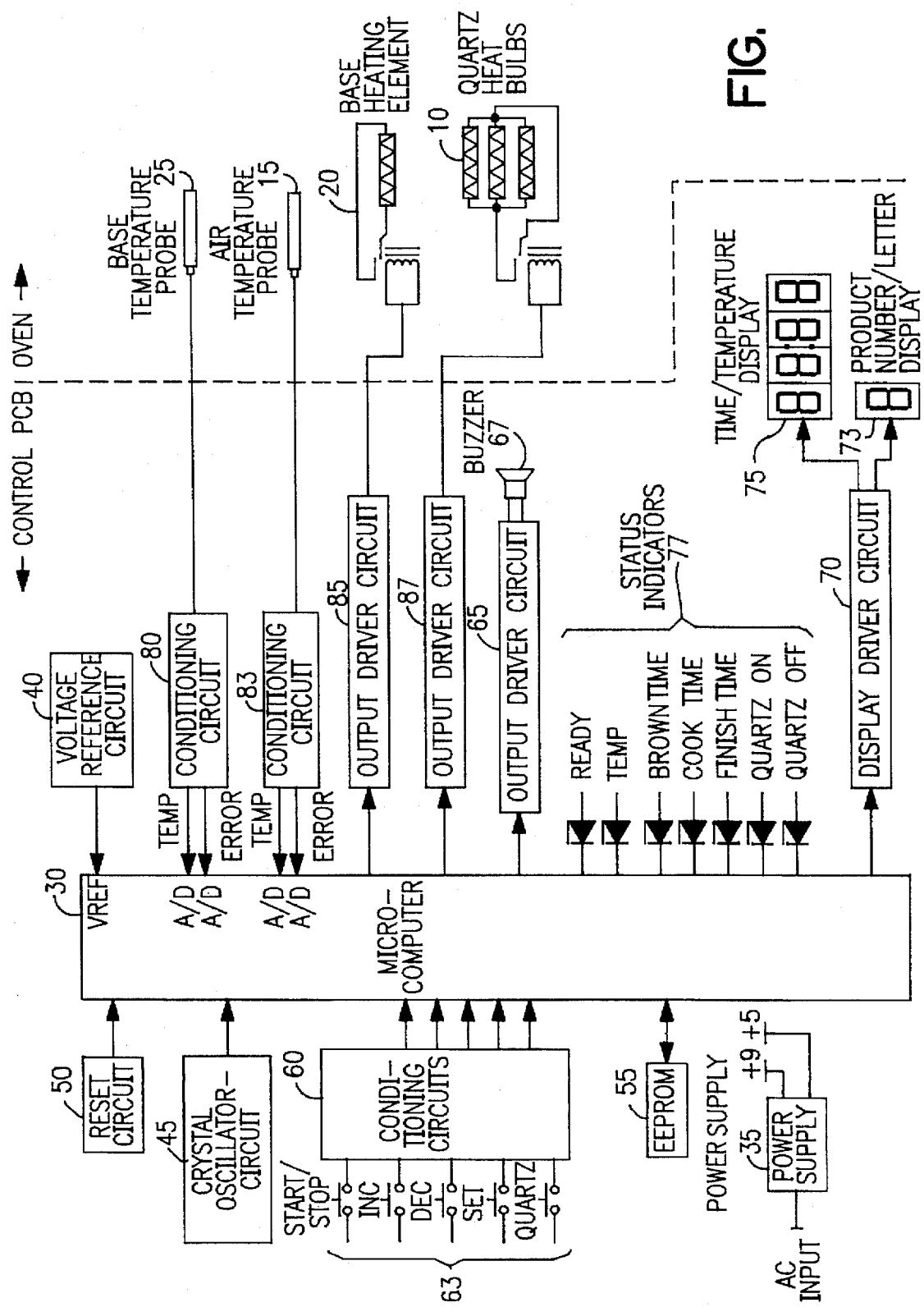
FIG. 1 shows a block diagram of the control hardware for the oven in the present invention.

Referring to FIG. 1, two heating elements 10 and 20 are disposed within an oven having a base and a cavity (not shown). Base heating element 20 is located preferably underneath a base plate, preferably the HTX TRANSITE II™ base by BNZ MATERIALS, INC. However, other base materials such as metal, compressed asbestos, ceramics or other materials on which food may directly be placed and which are able to withstand great temperatures may be used.

Base heating element 20 could be a gas heater or other heating means, but preferably is a 3200 watt CALROD electric heating element.

Located within the oven's cavity and above the base plate, preferably near the roof of the cavity, is located the second heating means 10, preferably quartz heat bulbs. The quartz heat bulbs must be able to provide a higher thermal intensity for a substantially brief heating period as opposed to the base heating element 20. Base heating element 20 preferably provides conducting heat whereas the quartz heat bulbs 10 preferably provide radiant heat. Both heating means also have appropriate relays or other circuitry to properly switch or toggle them from a first state (on) or a second state (off).

Two temperature probes are provided within the oven to detect temperature within the cavity and base of the oven. Base temperature probe 25 is thus located within or proximate to the base while air temperature probe 15 is located within an air duct immediately outside the oven cavity. Base temperature probe 25 should be placed so as to receive approximately the mean temperature of the base. Similarly, air temperature probe 15 should be placed within the oven cavity, so that it may detect the mean temperature of the air within the oven cavity. Consequently, probes 15 and 25 should not be placed too far, nor too close to heating elements 10 and 20.

Microcomputer 30, which preferably is a Motorola MC68705R3L, provides the computing resources for the hardware, and specifically for the control board. This microcomputer includes a microprocessor and also includes a 4-channel, 8-bit A/D converter which is used to convert the temperature voltage signals from temperature probes 15 and 25 to digital values for computing and control. Microcomputer 30's internal non-volatile memory (ROM or PROM, or preferably EPROM) stores the program code described in detail below. Microcomputer 30 also contains internal random access (RAM) which is used for calculation purposes.

Power supply 35, located mainly on the control board in a preferred embodiment, also includes an off-board transformer which converts an AC power input into a proper power supply for the control board and microcomputer 30. Capacitors are provided in power supply 35 to provide EMI/RFI filtering. Additionally, fuses and metal oxide varistors (MOV) are included to provide surge protection. Power supply 35 also preferably includes a diode bridge to fully rectify an AC input voltage into a DC voltage. Additionally, an integrated circuit voltage regulator, as is commonly available in the market, is provided. All of the above elements and construction for power supply 35 are well known in the art.

Reset circuit 50 coupled to microcomputer 30 preferably comprises a capacitor. Crystal oscillator circuit 45 forms the system clock oscillator comprised of preferably a capacitor and a crystal oscillator oscillating at 4 megahertz. This results in an internal clock rate of 1 megahertz. Voltage reference circuit 40 establishes the reference voltages for the internal A/D converter.

EEPROM 55 is a non-volatile memory, preferably located on an integrated circuit capable of serial communications, for example, TS93C46. EEPROM 55 stores the product parameters: times, temperatures, quartz heating settings, and load compensation factors, all of which will be described in more detail below. Appropriate protection circuitry is preferably also connected with EEPROM 55 to insure that the contents of the non-volatile memory are not inadvertently changed during control power-up and power-down.

Microcomputer 30 also contains appropriate inputs 63 for user input located on the exterior of the oven and outputs for display devices described below. Protection circuitry to insure that noise does not generate false interrupts or corrupt control signal operation is included as well known to those in the art.

Conditioning circuit 60 provides preferably pull-down resistors which insure that switch input voltages from user input switches 63 do not float when no switch is pressed. Thus, circuit 60 results in preferably an output voltage of approximately 5 volts when a switch is pressed and approximately 0 volts when no switch is pressed.

LED status indicator 77 is provided to indicate the following states: ready, temperature, brown time, cook time, finish time, quartz lamp on, quartz lamp off. These states will be describe in more detail below. Signals from microcomputer 30 are coupled to status indicators 77, preferably, LEDS, but could be other indication means.

Display driver circuit 70 is preferably an integrated circuit such as MC14489. The display driver circuit 70 preferably is a multiplexing driver circuit to drive time/temperature display 75 and product number/letter display 73. Displays 73 and 75 are preferably seven segment LED displays, but could be other indicating means as are well known in the art. Displays 73 and 75 and indicator 77 are preferably physically located on the control panel on the front panel of the oven. Seven segment display 75 can display both time, numbers and limited alphanumeric messages of up to four characters. Display 73 is used to display the current selected product number from 1 to 9 or a letter from A through F.

Buzzer 67 is preferably a piezoelectric buzzer having a main feedback and ground connection. The buzzer is used to provide audible feedback to the operator of various control operation conditions. Output driver circuit 65 preferably is a modified Hartly oscillator which drives buzzer 67 circuit near its resonant frequency for maximum efficiency in terms of sound pressure level. Output driver circuit 65 preferably includes a switch or means to select a desired setting for the buzzer sound pressure level. Associated driver circuitry is also included in driver circuit 65 as is well known in the art.

Temperature sensor conditioning circuits 80 and 83 are preferably identical signal conditioning circuits connected to base temperature probe 25 and air temperature probe 15, respectively. Conditioning circuits 80 and 83 also preferably include circuitry to determine probe failure in either "open" or "shorted" failure modes and forward signals to microcomputer 30. Thus, two inputs, a temperature and error inputs, are provided from each conditioning circuit 80 and 83 into the A/D inputs of microcomputer 30. Associated capacitors are provided in conditioning circuits 80 and 83 to provide for EMI and other noise filtering functions, as are well known in the art.

Output driver circuits 85 and 87 are preferably two identical output circuits for driving base heating element 20 and quartz heat bulbs 10, respectively. Driver circuits 85 and 87 preferably include optoisolated triac driver integrated circuits such as MOC3041. Appropriate protection circuity is provided to prevent false turn-on as is well known in the art. Control signals are provided from microcomputer 30 into driver circuits 85 and 87 to turn on heating elements 20 and 10 at appropriate times, as will be discussed more fully below.

The present invention preferably also includes circuitry to provide for additional heating means in the oven should they be desired to provide even greater flexibility and control as the presently described embodiment. A fan fail circuit may also be provided to detect failure of the of off-board cooling fan and thus warn an operator or shut down the system to prevent further damage.

Overall Process Performed

The overall operation of the process of the present invention in a preferred embodiment is depicted in the flow diagram of FIG. 3, and will now be described in some detail below. The process is executed by microcomputer 30 (shown in FIG. 1) and resides in the internal non-volatile memory of microcomputer 30 (not specifically shown in FIG. 1).

Figure 3:
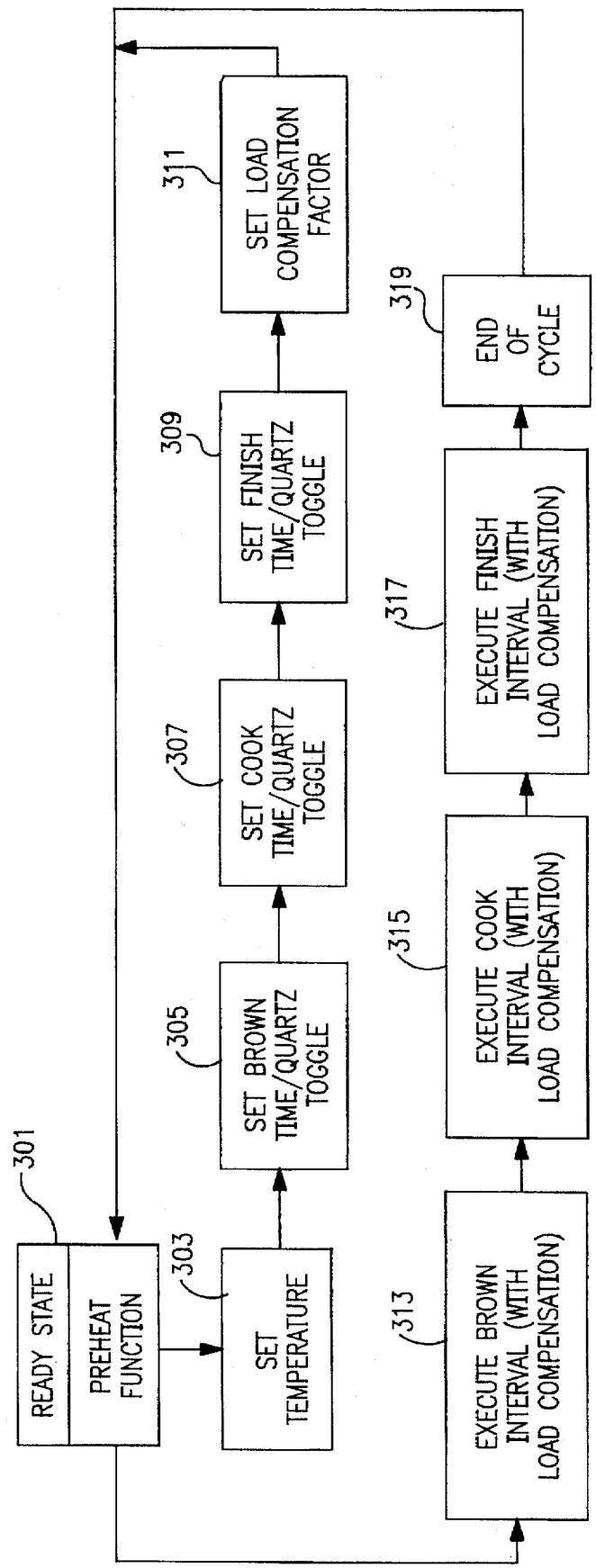
FIG. 3 shows a flowchart for the overall functioning of the present invention.

Referring to FIG. 3, the three aspects of the present invention are shown interacting with one another. Specifically, step 301, the ready state/preheat function is performed when the oven's operation is initially started, and is repeated as needed thereafter. This step generally consists, in part, of heating the base of the oven to a predetermined temperature by means of activating the base heating element (element 20 in FIG. 1) and thereafter heating the air in the oven's internal cavity to a predetermined temperature by means of the quartz heat bulbs (element 10 in FIG. 1). The automatic preheat steps are described in more detail in U.S. Pat. No. 4,296,683 entitled "PREHEATING METHOD AND APPARATUS FOR USE IN A FOOD OVEN" incorporated herein by reference.

When a user of the present invention wishes to set the various parameters corresponding to the operation of the oven, he/she may press a "SET" switch (such as the "SET" switch of element 63 of FIG. 1). In a preferred embodiment, the present invention will thereafter prompt the user to enter the various parameters, examples of which are illustrated in steps 303-311. For example, in a preferred embodiment, the user may utilize the increment/decrement switches of element 63 (INC and DEC) to modify the parameters in steps 303-311. In another embodiment, the user may directly enter the desired parameters on a device such as a numeric keypad, etc.

Step 303 comprises setting the base setpoint temperature for the oven. This value represents the desired temperature of the base plate of the oven. This value is used during the preheat function (step 301) as well as the actual oven usage intervals as described below with respect to steps 313-317.

Steps 305-309 comprise setting the time for the "brown," "cook" and "finish" intervals as well as switching the quartz lamps to either be on or off during each interval according to one embodiment of the present invention. The selected values are stored in memory. In a preferred embodiment, the operator may select a time duration between 0-15 minutes for each cooking interval, where the total cooking time is the sum of the selected cooking interval times. The time of each interval may be displayed on display 75. After the time for a particular interval is selected, the operator sets heating element 10 to be on or off during that interval. A toggle switch may be provided to set heating element 10. The operator then selects the time for the next interval. However, the order in which the values are selected is not critical. For example, each of the interval times may be selected first, and then the heating element 10 may be set for the individual intervals. In addition, the structure used to select the interval times and to selectably set heating element 10 is not critical. One of skill in the art may recognize a variety of structures to accomplish these functions, including a numeric keyboard with an on/off button, individual buttons, dials, etc. In a preferred embodiment. LED status indicators prompt the operator to select a particular parameter.

The selected times and settings are stored within the control system of the present invention, and are thereafter utilized in steps 313-317 to determine the appropriate timing characteristics of the various cooking intervals and the operation of heating element 10. In a preferred embodiment, the first heating element 10 is set on during the "brown" interval, off during the "cook" interval, and on during the "finish" interval. These intervals and cooking steps are described in greater detail in U.S. Pat. No. 5,182,439 entitled "METHOD AND APPARATUS FOR OPERATING A FOOD OVEN" incorporated herein by reference.

Steps 311 involves setting a load compensation factor. The load compensation factor is utilized by the load compensation aspect of the present invention to account for the type of load being cooked within the oven and the particular temperature within the oven. The load compensation factor is used by steps 313-315 in a preferred embodiment to compensate the timing characteristics of the various operating intervals, and it will be described in further detail below with respect to FIGS. 2a and 2b. After the load compensation factor has been set, execution transfers back to the ready state/preheat function until the user requests another operation.

Steps 313-317 involve executing the "brown," "cook" and "finish" intervals according to a preferred embodiment of the present invention. These steps are executed after the associated characteristics have been set in steps 303-311, and when the user selects, in a preferred embodiment, the "start" function by pressing the "Start/Stop" key ("START/STOP" switch of element 63 of FIG. 1). Steps 313-317 utilize the corresponding temperature, times, load compensation factor, and heating element 10 switch settings selected in steps 303-311. Specifically, the temperature set in step 303 is maintained throughout these steps, the times for the various intervals are kept in conjunction with the load compensation factor, and the quartz lamp operational status is maintained for each of the three intervals in a preferred embodiment. If the time of a particular interval is set to 0, that interval is skipped. Throughout the cooking cycle, status indicators 77 indicate the interval which is being executed.

Finally, step 319 corresponds to the end-of-cycle operation performed after the "brown," "cook" and "finish" intervals are completed. After this step has been reached, execution is transferred back to the ready state/preheat function of step 301. A more detailed description of a preferred embodiment of the present invention follows.

Load Compensation Operation

As described above, a purpose of the present invention is to ensure a uniformly processed product, regardless of product and environment variations. For example, the temperature of the food product entering the oven may vary depending on whether it is frozen or fresh, and how long it has been unrefrigerated before cooking. The stored heat of the oven will vary depending on the usage of the oven prior to cooking the product. For examples, in the case of a pizza oven, the stored heat of the oven will be greater after several pizzas have been cooked, than it is during cooking the first pizza of the day. A system is needed which compensates for variations in the temperature of the product (load) and the environment—a load compensation.

Some experimental results indicate that one of the best ways to perform load compensation in an oven having two heating elements is to vary the on-time of the quartz lamp. The on-time of quartz lamp 10 preferably changes as the function of the actual air temperature in the oven and the base temperature set point measured by air temperature probe 15 and base temperature probe 25 respectively, as well as the load compensation factor. Thus, as the air temperature increases, the quartz on-time is shortened. In a preferred embodiment, the quartz on-time is never lengthened, although such an implementation is certainly possible.

Various degrees of load compensation may be programmed into EEPROM 55. Preferably, the load compensation may be set from 0 to 10. Zero is equivalent to no load compensation with 10 equivalent of (100%) load compensation. Load compensation may be programmed by the user from input switches 63 and stored in EEPROM 55. Additionally, the exterior front panel of the oven would preferably include a method of inserting a menu indicating which food item, and corresponding previously programmed load compensation, may be selected by a user.

Basically, implementation of the load compensation performs the following steps to determine the on-time of quartz lamp 10.

(1) Read the load compensation factor from a non-volatile memory.

(2) Set a variable "LcLim" to the difference between the base temperature set point (in A/D bits) and a constant.

(3) If "LcLim" is less than zero, then set LcLim to zero: otherwise, set LcLim to the base temperature set point multiplied by a constant minus another constant.

(4) During each pass through the main loop:

(i) Set "TempErr" to the difference between the oven cavity air temperature and LcLim.

(ii) Set a variable "N1" to TempErr multiplied by a load compensation value contained in a table indexed by the load compensation factor previously read from the non-volatile memory.

(iii) Determine if variable N1 is less than a constant and if so assign it a value.

(iv) Determine if TempErr is less than a constant. If so, assign LcReset a constant value. If not, assign LcReset the value of a constant minus N1 times a constant.

(v) When a cooking interval begins, if the quartz lamps have been programmed to be turned on during the interval, then:

(i) Set "QClock" to the total number of seconds programmed for the cooking interval.

(ii) Set "LcCount" to the value of LcReset, and set "LcSec" to a constant, preferably 10.

(iii) During each timer interrupt, decrement LcCount, and when LcCount reaches zero, decrement LcSec.

(iv) Decrement "QClock" when LcSec reaches zero.

(v) Turn quartz lamps off when QClock reaches zero.

Figure 2A:
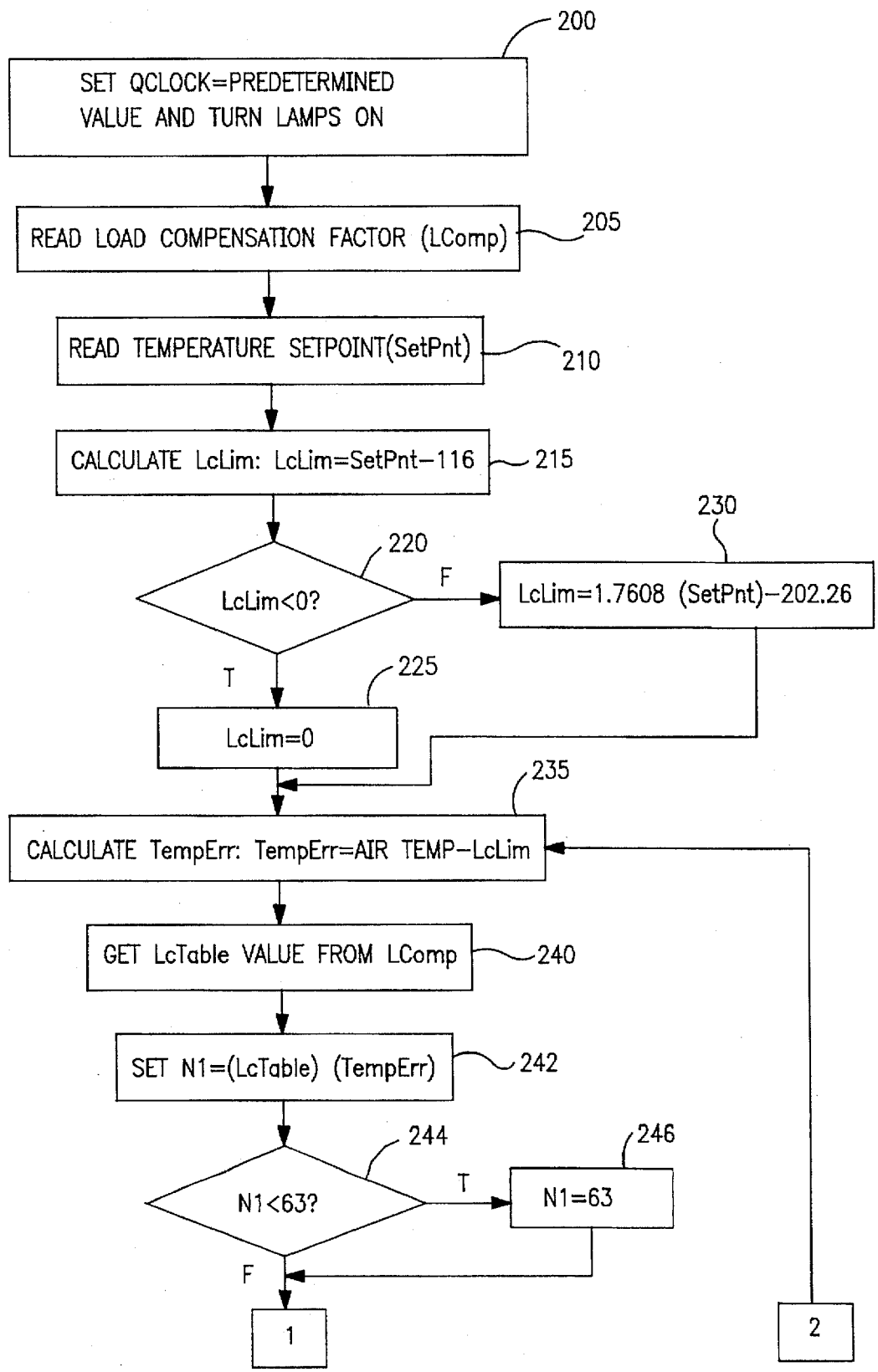
FIGS. 2a and 2b show flow charts detailing the operation of the present invention.
Figure 2B:
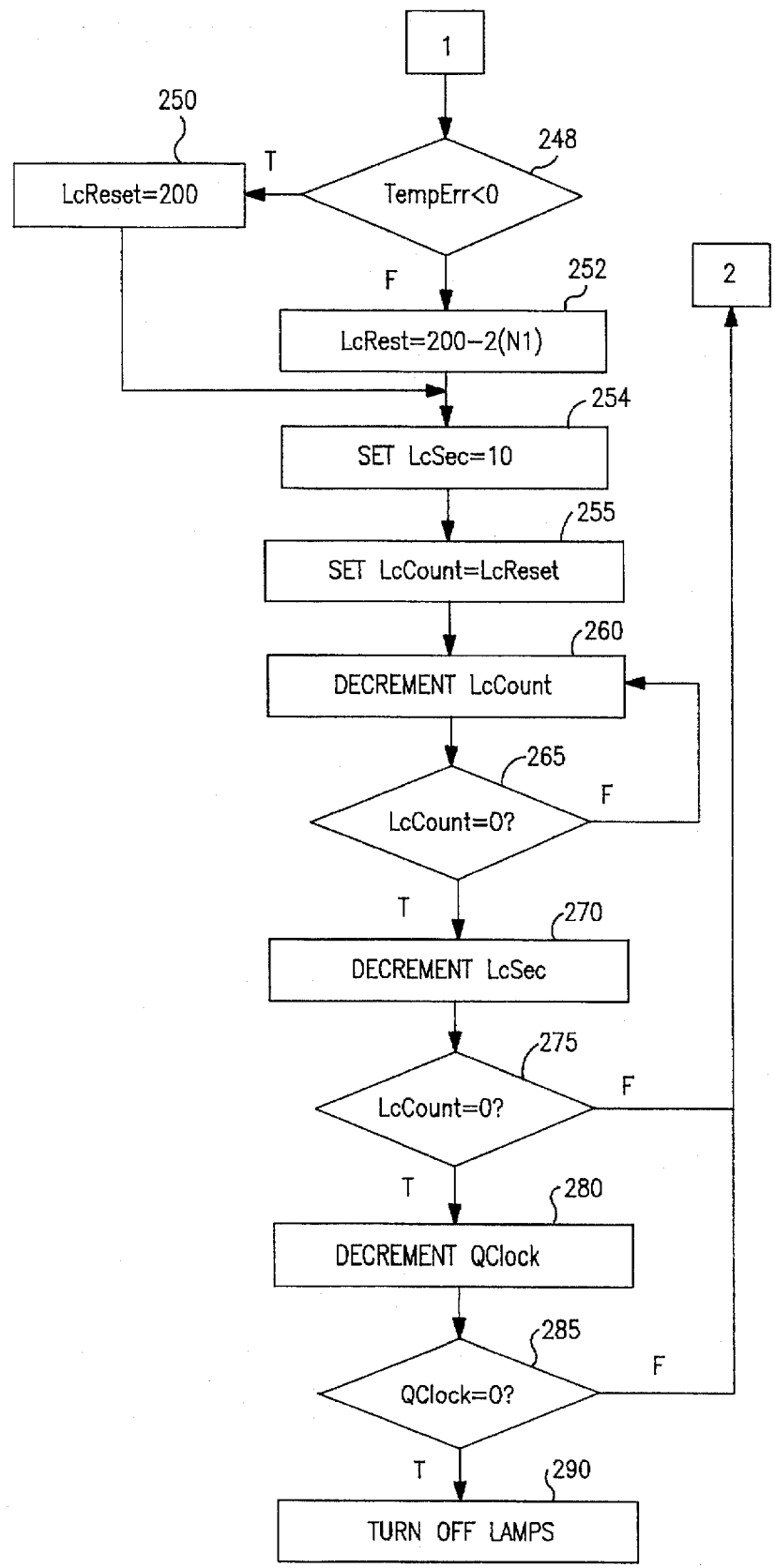

Referring to FIGS. 2a and 2b, the basic operation described above for the load compensation factor is depicted. Each time an interval starts during the cooking process (i.e. brown, cook or finish), the control program checks to see if the quartz lamps have been programmed on for that interval. If the quartz lamps had been programmed on, then a variable QClock is calculated as:

$$QClock=60 \text{ (minutes)}+\text{seconds}$$

QClock obviously is then the total time in seconds. QClock is a clock that is run in parallel with the cooking time display 75 which is displayed on the front surface of the oven. QClock does not keeps "real" time but rather a compensated time depending upon the current air temperature of the oven and the load compensation factor. Thus, the higher the air temperature the more quickly QClock will decrement. Referring to FIG. 2a, QClock is set to a predetermined value for the particular cooking interval when the quartz lamps have been programmed on in block 200.

A load compensation factor depending on a particular food item is read from EEPROM 55 and stored in the RAM memory of microcomputer 30 as variable LcComp in block 205. The SetPnt temperature is stored as A/D bits and not in degrees. A particular predetermined temperature set point "SetPnt" is read from non-volatile memory in block 210. SetPnt represents a base temperature which is desired for a particular product to be cooked. Thus, a sandwich at room temperature would presumably have a lower predetermined SetPnt temperature while a frozen pizza would have a higher SetPnt value.

In block 215, the value LcLim is calculate by the formula:

$$LcLim=SetPnt-116$$

If LcLim is less than 0 (block 220), then LcLim is set to 0 (block 225). Otherwise, if LcLim is greater than 0, then LcLim is calculated in block 230 as:

$$LcLim=1.7608(SetPnt)-202.26$$

Next, a temperature error value TempErr is calculate in block 235 by the formula:

$$TempErr=AirTemp-LcLim$$

where AirTemp is the current actual air temperature in the oven cavity as detected by air temperature probe 15. Temperature from air probe 15 is read in and filtered through conditioning circuit 83 and into A/D channel of microcomputer 30. Additionally, block 230 determines whether an error exists in air temperature probe 15. TempErr is an error value representing the difference between the current actual air temperature and the desired air temperature for the current base temperature SetPnt.

Using a lookup table stored in non-volatile memory, a value LcTable is selected in block 240 from the previously read load compensation factor LcComp. The following table shows the entry for valid values of LcComp:

| LcComp | LcTable Entry |
|--------|---------------|
| 0      | 0.000         |
| 1      | 0.102         |
| 2      | 0.200         |
| 3      | 0.298         |
| 4      | 0.400         |
| 5      | 0.502         |
| 6      | 0.600         |
| 7      | 0.702         |
| 8      | 0.800         |
| 9      | 0.902         |
| 10     | 1.000         |

Note that these table entries step from 0 to 100% in steps of approximately 10%.

In block 242, a variable N1 is set by the formula:

$$N1=(LcTable)(TempErr)$$

If N1 is less than 63 (block 244) then N1 is set to 63 in block 246. This is necessary to establish the maximum amount of load compensation that can occur. Note that the constant 63 could be another number but is preferably set to this value. Referring now to FIG. 2b, if TempErr is less than 0 (block 248), then LcReset is set to 200 (block 250). Otherwise, LcReset is calculated by the following formula in block 252:

$LcReset=200-2(N1)$

Figure 4:
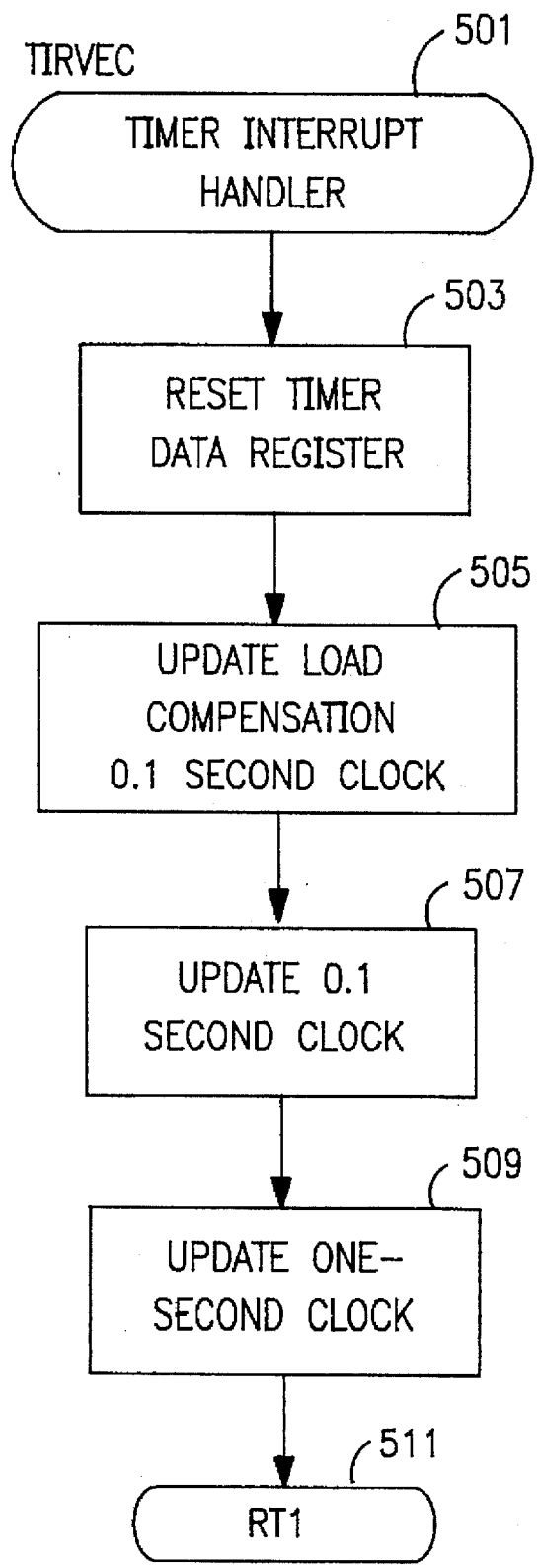
FIG. 4 shows a flowchart of the timer interrupt handler steps performed by the present invention.

Timer interrupts occur 2,000 times a second and are described in FIG. 4. Referring briefly to FIG. 4, block 501 indicates the beginning of the timer interrupt handler subroutine. In block 503, the timer data register is reset. In block 505, load compensation 0.1 second clock is updated. In block 507, the 0.1 second clock is updated. In block 509, the 1 second clock is updated. And in block 511, the subroutine interrupt instruction is returned.

FIG. 2b shows that in block 254, LcSec is set to 10. In block 255, LcCount is set to equal LcReset.

In block 260 of FIG. 2b, the dock LcCount is decremented. In block 265, if LcCount is equal to 0, then the dock LcSec is decremented in block 270. Otherwise, LcCount is again decremented in block 260. If dock LcSec is equal to 0 (block 275), then QClock is decremented in block 280. Otherwise, the process returns to block 235 and again goes through the above described steps.

If QClock equals 0 in block 285, then quartz lamps 10 are turned off in block 290. Otherwise, the process again returns to block 235.

From the above we see that the counter LcReset determines the length of a compensated second.

To summarize, the docks involved in load compensation are:

LcCount: is initialized to LcReset. LcCount is decremented at each timer interrupt, and times are approximately 0.1 seconds. Actual time is 0.1 "compensated" second.

LcSec: is initialized to 10. LcSec is decremented (in UpdQClock routine) each time LcCount reaches 0, and its time approximately equals 1 second. Actual time is 1 "compensated" second.

QClock: is initialized to the total seconds in a predetermined and programmed interval (brown, cook or finish). QClock is decremented (in UpdQClock routine), each time LcSec equals 0. Its actual time is the total "compensated" interval time.

While the present invention has been disclosed with respect to a preferred embodiment and modifications thereto, further modifications will be apparent to those of ordinary skill in the art within the scope of the claims that follow. For example, although the formulas used to determine load compensation are linear as a function of air temperature and the SetPnt, this is not mandatory. A polynomial or logarithmic function would provide a better approximation to the effects of cooking time and temperature, but would complicate the process.

The compensation time could be made a function of the actual base temperature as well as the base SetPnt and other factors, including the air temperature as described above. The compensation could be designed to extend the quartz lamp on-time as well as the above described decrease in quartz on-time. Additionally, the quartz on-time compensation could be designed to work in conjunction with total cooking time compensation rather than on an interval basis.

The load compensation factor need not be the same for all intervals, and more intervals than three could be added. Greater details on operation of the steps in the above implementation are described in great detail in the source code attached at Appendix A. These details shown in this Appendix are primarily concerned with underflow, overflow, fractional representations of binary numbers and handling of signs of binary numbers. Refer specifically to the routines "READPROD, AIRSTAT and UPDQCLOCK" in this Appendix. All these techniques are obvious and well known to one skilled in the art and may include other techniques known to those skilled in the art. Consequently, it is not intended that the invention be limited by the disclosure, but instead that its scope be determined entirely by reference to the claims which follow.

In an alternative embodiment, a load compensation technique is disclosed for use specifically with a rotisserie type cooking oven. An example of a rotisserie cooking device and a control therefor is disclosed in U.S. Pat. Nos. 4,968,515 and 5,044,262 issued to Burkett et al. and assigned to the assignee of the present invention. These patents are hereby incorporated herein by reference.

According to one aspect of this embodiment, the actual cooking time of a rotisserie is adjusted based on a load compensation factor and a difference between an actual air temperature and set point temperature. According to this technique, each displayed second of the cooking time is lengthened or shortened based on the difference in temperature between the actual sensed temperature and the set point temperature.

According to this embodiment, at the start of each new displayed cook timer "second," the timer interrupt code accesses a look-up table to obtain a multiplier associated with the current load compensation setting. It then multiplies the temperature difference (Actual air temperature–Setpoint temperature, preferably in degrees F.) by this multiplier to arrive at a time adjustment value.

If the actual air temperature is ABOVE the current setpoint temperature, the adjustment value is SUBTRACTED from a nominal value of "100" (i.e., $100/100$ths of a second) and reloaded into the 100 Hz countdown component of the cook timer. This results in a "cook timer second" which is <$100/100$ths of a real second, and therefore results in a cook timer that counts down FASTER than real time.

If the actual air temperature is BELOW the current setpoint temperature, the adjustment value is ADDED to a nominal value of "100" and reloaded into the 100 Hz countdown component of the cook timer. This results in a "cook timer second" which is >$100/100$ths of a real second, and therefore results in a cook timer that counts down MORE SLOWLY than real time.

EXAMPLE

If the load compensation setting for the current product is "5," the setpoint temperature is 350 F., and the air temperature in the rotisserie is currently 320 F., then the temperature difference (350–320) is 30 Deg F. BELOW setpoint temperature Since the load compensation setting is 5, then from the look-up table, the multiplier associated with this setting is found, which in one embodiment is 0.5.

From this information, the load compensation adjustment can be obtained as follows:

$LCAdjust=30*0.5=15$

Since the temperature is BELOW setpoint, the adjustment (15) is ADDED to 100 to EXTEND the length of a "second" of cook time. Therefore, the 100'ths byte of the cook timer (CookTmr. 100s) is loaded with $115/100$ths 100+LCAdjust seconds.

Therefore, the next "second" (i.e. displayed second) of cook time is $15/100$ths seconds longer than a "real" second.

According to one embodiment, the temperature difference may be limited to a maximum, (e.g., +/–255 degrees F.) so that the "TmpDif" (temperature difference) can be handled as an 8-bit integer. When it is MORE than 255 degrees F. above or below setpoint, the Load Compensation adjustment will be the same as if it were exactly 255 degrees F. above or below setpoint, though it would rarely be this far from setpoint while cooking.

Also, the final 100's reload value may be limited to the range "LC100Min," to "LC100Max.," as a means of restricting the timing to reasonable rates. For example, these constants can be set to limit the minimum 100's reload value to $^{50}/_{100}$ths seconds, and the maximum reload value to $^{200}/_{100}$s. This effectively limits the load compensation to at most halving or doubling the cooking time.

Preferably, the actual cook timer components—Hours, Minutes, seconds, and 100ths of seconds—actually count down to −1 rather than to 0, so they are reloaded with values 1 less than the item they count. For example, 100ths of seconds is normally reloaded with "99" to count one full second (99. . . −1=$^{100}/_{100}$ths of a second), and reloading minutes with 59 will result in a 60 minute countdown (59.−1). This adjustment to the 100ths component of the cook timer is made by simply decrementing the calculated reload value just before saving it into the 100ths byte of the cook timer. Preferably, all of the load compensation calculations are made based on a nominal value of "100."

According to one embodiment, the look-up table, referred to as the "LCPercentTbl," is represented as 8-bit fractional values, and is indexed by the load compensation setting (0 . . . 10). In a preferred embodiment, the table contains the following values.

| 8 bit fractional value (/256) | Load Compensation Setting |
|---|---|
| 0 | 0 = 0% |
| 26 | 1 = 10% (10% * 256 = 25.6) |
| 51 | 2 = 20% (20% * 256 = 51.2) |
| 77 | 3 = 30% (30% * 256 = 76.8) |
| 102 | 4 = 40% (40% * 256 = 102.4) |
| 128 | 5 = 50% (50% * 256 = 128.0) |
| 154 | 6 = 60% (60% * 256 = 153.6) |
| 179 | 7 = 70% (70% * 256 = 179.2) |
| 205 | 8 = 80% (80% * 256 = 204.8) |
| 230 | 9 = 90% (90% * 256 = 230.4) |
| 255 | 10 = 100% (255/256 − 99.6%) |

The values in this table may be changed based on actual cook testing and analysis. Also, the progression of values need not be linear.

Pages 1–6 of Microfiche Appendix B provide code excerpts which illustrate a preferred way of carrying out this embodiment. The "DoState100HzTmrs" subroutine is preferably called every $^{1}/_{100}$th second by the (hardware) Timer-ISR (Interrupt Service Routine). The "AlmEoc100s" timer, handled at the start of DoState100HzTmrs, is separate from load compensation.

The values in the LCPercentsTbl are preferably implemented as 8-bit fractions (i.e. "X" in the table is implicitly the fraction "$^{X}/_{256}$"), but these multiplier constants do not need to be limited to fractional values. The multipliers could be 8-bit integer/8-bit fractional numbers, for example, to allow much more aggressive compensation.

In the preferred embodiment the cook time is sped up or slowed down by adding or subtracting "K*abs (SetptTmpF−AirTmpF)" to a nominal value of "100" when reloading the $^{1}/_{100}$s component of the CookTmr countdown timer.

$$CookTmr.100s := 100 + K*(SetptTmpF - AirTmpF)$$

(where "K" is the multiplier for the current LoadComp setting)

An alternate correction calculation would make the adjustment directly proportional to the percent temperature difference rather than just the temperature difference itself. In this embodiment, an air temperature that was 15% too low, for example, could result in a cook timer "second" that was 15% longer, etc. For example, the time could be adjusted as follows:

$$CookTmr.100s := 100 + K*((SetptTmpF - AirTmpF)/SetptTmpF)$$

Figure 5:
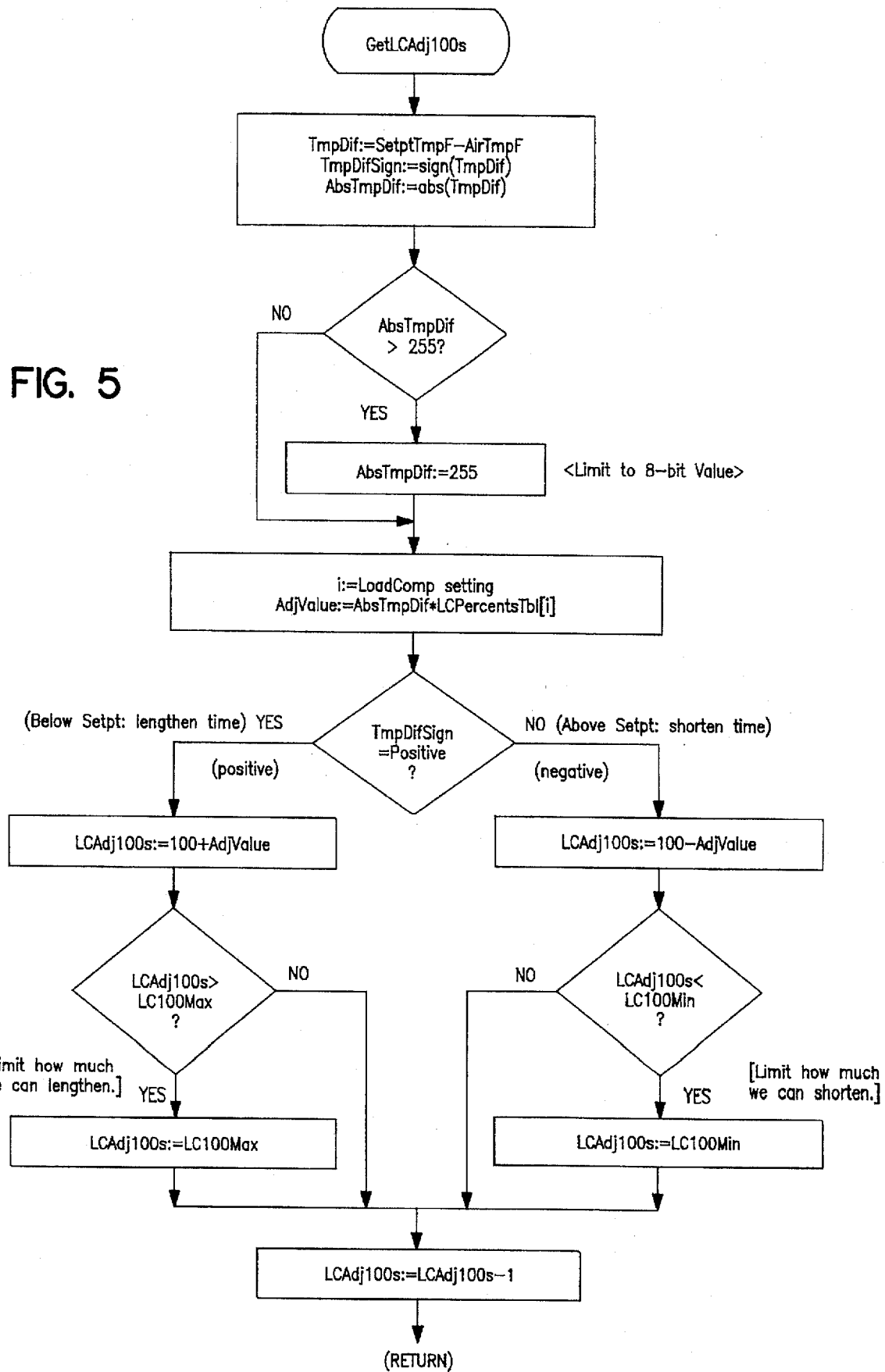
FIG. 5 is a flowchart for the "Dostate 100HzTMrs" subroutine.
Figure 6:
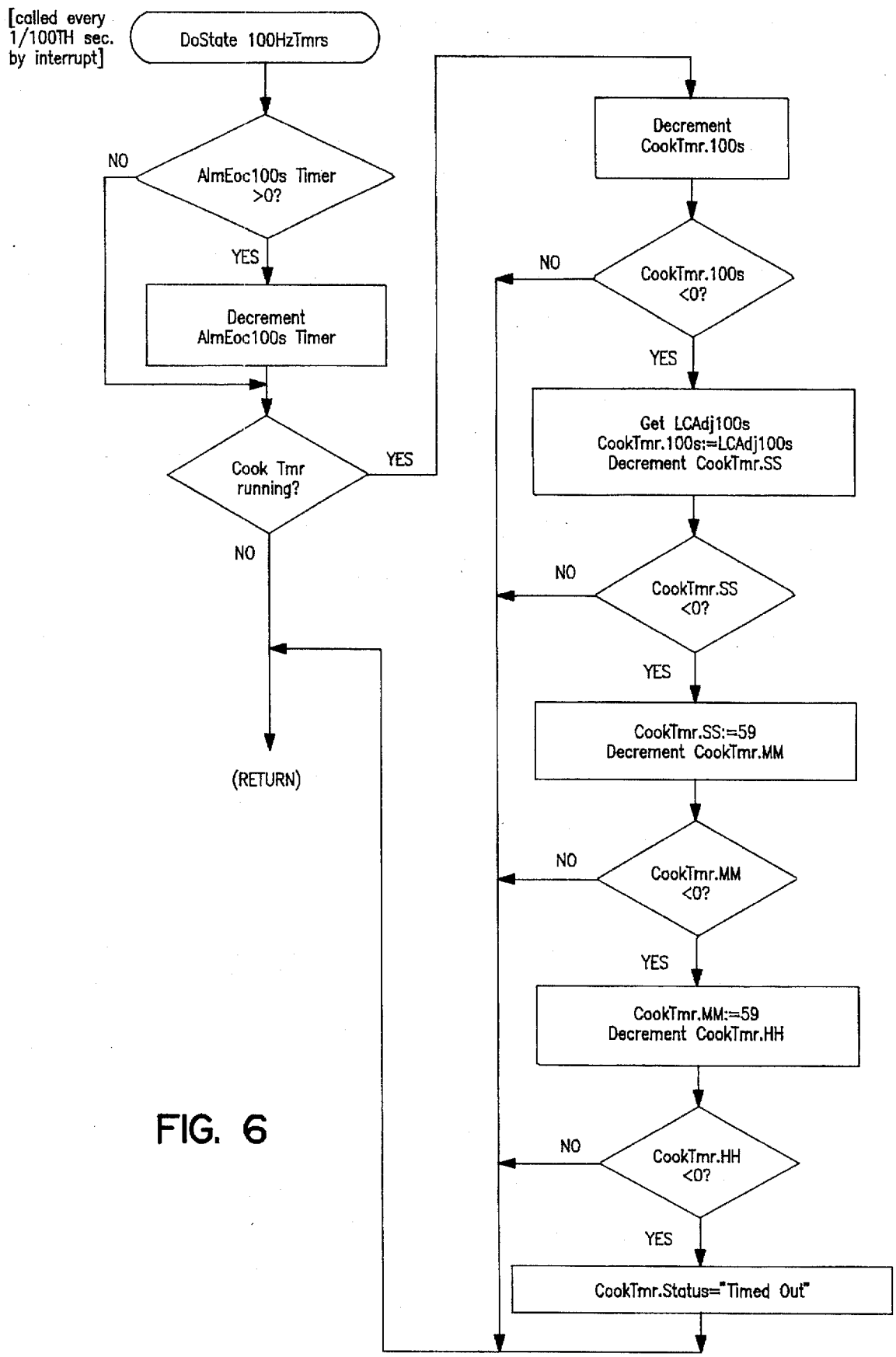
FIG. 6 is a flowchart for the "GetLCadj100s" subroutine.

A flow chart illustrating the steps in the "Dostate 100HzT-Mrs" subroutine is depicted in FIG. 5. A flow chart depicting the "GetLCadj100s" subroutine is depicted in FIG. 6.

The previously described hardware controller embodiments are usable with various types of food ovens. For example, but without limitation, the controller may be used in a rotisserie type oven, as discussed above. However, it is to be understood that the following control features are not limited to use in a rotisserie oven.

As described, for example, in U.S. Pat. No. 5,044,262 and 4,968,515, a rotisserie type food oven may be used to cook food in a cooking chamber by rotating the food about at least one axis within the cooking chamber. The rotation may be implemented by a rotor. The rotisserie type oven may include one or more types of heating elements to cook and/or brown the food. For example, one or more radiant heating elements and one or more air heating elements may be used. Typically, the air heating element(s) are used in combination with a fan (or blower) whereby the fan blows air over the heating elements to cause heated air to flow within the cooking cavity to assist in cooking the food. To control these (and other) components of the rotisserie, a controller may be used. To program and operate the controller, a user accessible control panel is provided. The control panel may include a plurality of input keys and displays.

The following is a description of another example of a controller which may be used to control a rotisserie of the type described above. However, the arrangement of the components need not be the same. Additionally, the concepts and features described below may be used in a controller to control other types of cooking appliances. Preferably, the controller is user accessible via a control panel which has a plurality of keys and displays, described in more detail below.

According to a preferred embodiment of the present invention, the rotisserie controller has several basic modes of operation. These modes include, without limitation, a STANDBY mode, a PREHEAT mode, a COOK mode, a HOLD mode, a PROGRAM mode, a SPECIAL PROGRAM mode and a TEST mode. The functions and operation of each of these modes is described below.

Figure 7:
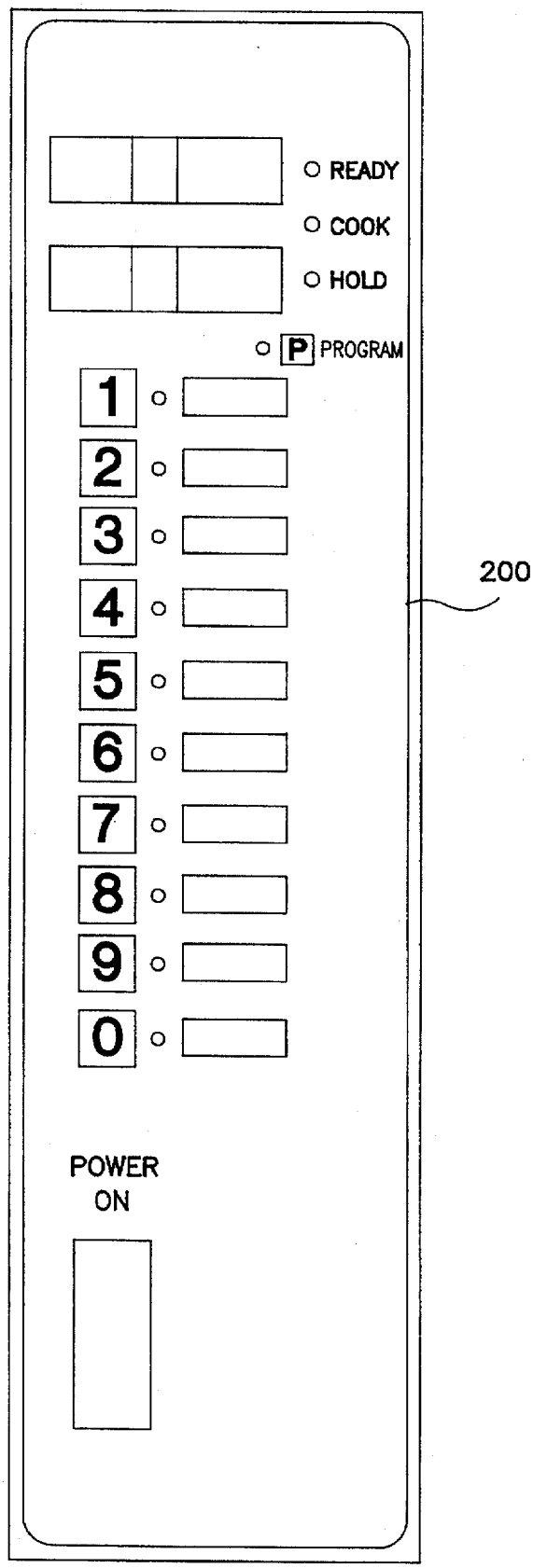
FIG. 7 is a schematic illustration of a control panel which may be used with one or more embodiments of the present invention.

As shown, for example, in FIG. 7, the control panel (200) may be configured as follows. Preferably, located on (or adjacent to) the control panel 200 are (2) five-digit LED displays (201A, 201B) including a top and bottom (or left and a right) display. As further discussed below, these displays show the temperature, time and messages associated with a control operation. Additionally, a plurality of LEDs are provided. For example, there may be a READY LED, a COOK LED, a HOLD LED and a PROGRAM LED. The READY LED turns on during PREHEAT when the air temperature is in the programmed READY range. It turns off during cooking, regardless of the air temperature. The COOK LED turns on when the COOK timer is running. The HOLD LED turns on when the HOLD timer is running. The PROGRAM LED flashes during PROGRAM mode.

Additionally, there are preferably a plurality of PRODUCT LEDs (1–9 and 0). One PRODUCT LED is located adjacent each PRODUCT switch. A PRODUCT LED turns on to show which product is selected, and flashes while the COOK and HOLD timers are running for that product. All PRODUCT LEDs turn on in PROGRAM mode when a product must be selected.

Preferably, there are 10 PRODUCT switches, labelled 1 through 9 and zero. However, any reasonable number of such switches may also be used. The PRODUCT switches are used to select a product and operate the COOK timers. Moreover, as described below, by providing 10 PRODUCT switches, these switches may also be used to enter numbers and other parameter values during PROGRAM mode.

Menu card windows are preferably located adjacent the PRODUCT LEDs. When the menu card is installed, from the back of the control panel, the menu legends are visible above each PRODUCT switch. This enables ease of identification and replacement. A POWER switch, for example, a 2-position rocker switch, is located adjacent the PRODUCT switches. This switch controls power to the rotisserie and the control. A ROTOR switch (not shown), for example, a momentary contact-type switch, is located adjacent (or on) the control panel. Pressing the ROTOR switch overrides automatic control of the rotor, and rams the rotor motor on. An identical switch may be located on the opposite side of the rotisserie, especially when the rotisserie has two doors (e.g., on opposite sides of the rotisserie) for accessing the cooking chamber.

A speaker (not shown) is conveniently located in the control panel or any other suitable location. It is used to generate audible alarms (as discussed herein) and to provide switch feedback. Preferably, as described in more detail below, the control may be programmed to generate alarms having different volumes and different tones.

A general description of the various modes will now be provided, followed by a more detailed description of the functions and operations performed in these modes along with excerpts of the source code for the software routines which are run by the controller during these modes to control the operation of the cooking appliance.

In STANDBY mode, the control is waiting for the operator to select a product. Thus, the display scrolls "SELECT Product" across the LED displays. STANDBY is entered, for example, when power is applied to the rotisserie or when a COOK cycle timer is cancelled. In PREHEAT mode, the control preheats the rotisserie to the programmed PREHEAT temperature (discussed below). The PREHEAT mode is entered when a product is selected. From the PREHEAT mode, to enter the COOK mode and thereby start the COOK timer, the PRODUCT switch is pressed. In COOK mode, the control causes the display to display the time remaining in the COOK cycle and regulates the process outputs for each stage of the COOK cycle to the parameter settings programmed during the PROGRAM mode. The HOLD mode is an optional mode in which the control regulates the process outputs as programmed for holding product after it is cooked. HOLD mode is automatically entered after the COOK timer end-of-cycle (EOC) alarm. In the PROGRAM mode, the PREHEAT, COOK and HOLD parameters are set. PROGRAM mode is entered by pushing and holding the "Program" (P) switch. Once in PROGRAM mode, pushing and holding the "Program" switch causes the controller to exit the PROGRAM mode. In the SPECIAL PROGRAM mode, system settings are set. Such settings include, for example, probe calibration, selection of ° F./° C. operation, READY RANGE limits, and CPU temperature display. SPECIAL PROGRAM mode is entered by pressing and holding the PROGRAM switch until the displays show "SPCL Prog." SPECIAL PROGRAM mode is exited by pressing and holding the "Program" switch. The TEST mode enablers various output tests to be performed as described below.

Figure 8:
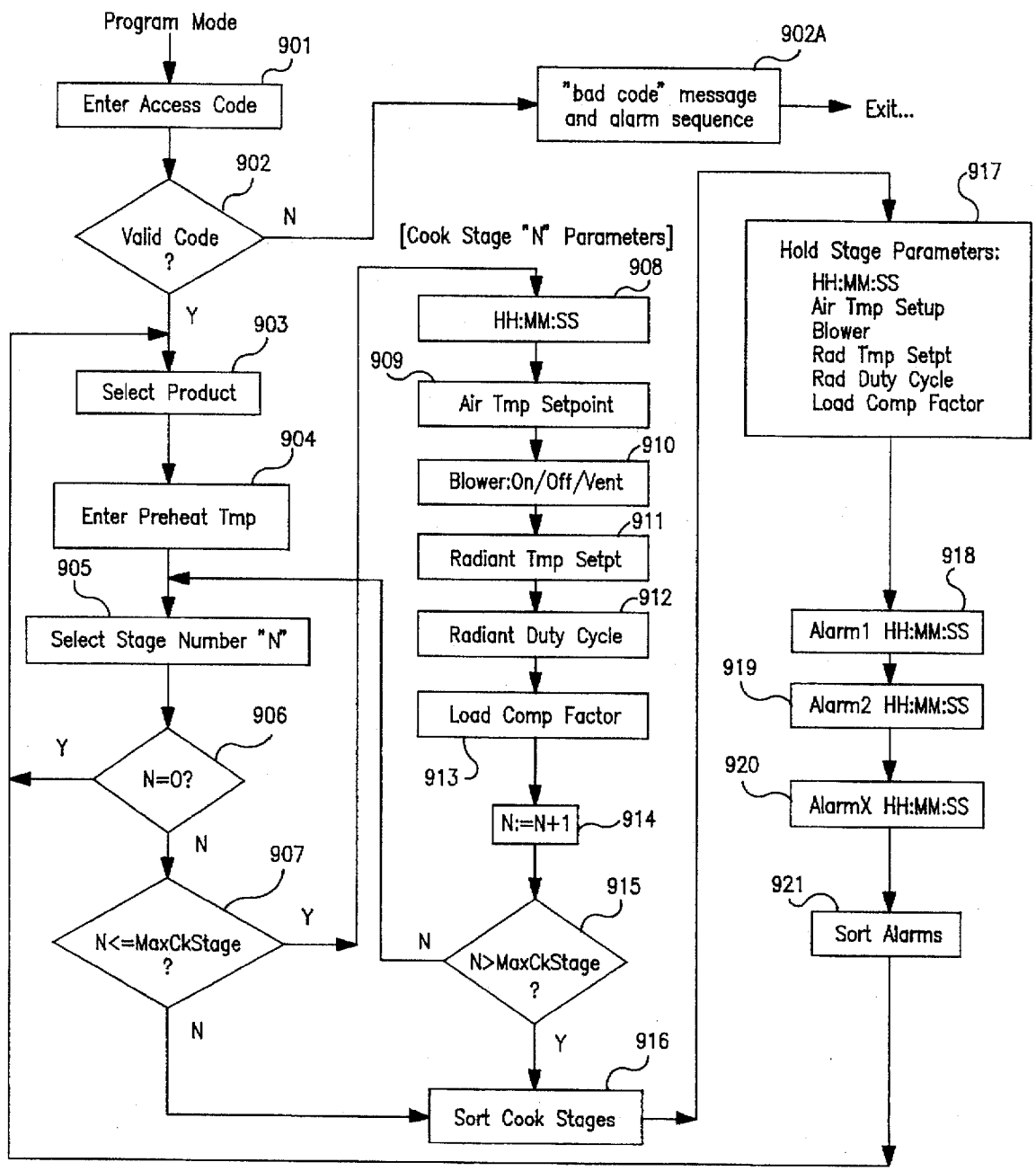
FIG. 8 is a flow chart of the PROGRAM mode.

According to a preferred embodiment, in PROGRAM mode, the control can be programmed by a user for up to 10 products. Each PRODUCT program, corresponding to a COOK cycle, can include 10 COOK stages, an optional HOLD stage, and four process alarms. Of course, other numbers of stages and alarms could easily be accommodated. With reference to FIG. 8, a description of one embodiment of the PROGRAM mode will now be described. PROGRAM mode is entered by pressing and holding the PROGRAM ("P") switch until the displays show "Prod Set," then the top display shows "Code." An access code is entered (step 901) with the PRODUCT keys to prevent unauthorized use of the PROGRAM mode. Once the proper access code is entered (step 902), the top display scrolls "SELECT Product," the bottom display shows "0–9," and all product LEDs turn ON. If no key is pressed for 15 seconds after the "Code" message display, the speaker sounds an alarm, the displays show "code" and "_____," and the control resumes operation. If an invalid password is entered, the displays flash "Bad" and "Code" (902a), and the speaker sounds at the maximum volume for 10 seconds. The control then resumes operation. Once access has been granted, the top display scrolls "SELECT Product" and the bottom display shows "0–9." As in COOK mode, the desired product is selected by pressing one of the PRODUCT keys (0–9) (step 903).

When the product has been selected in PROGRAM mode, the displays are used in a consistent way. The top display describes the parameter and the bottom display shows the current value of the parameter. Once the product is selected, each press of the program switch advances to the next parameter. The parameters are described below.

Next, the PREHEAT temperature is selected (step 904) by using the PRODUCT keys and pressing the PROGRAM switch, which acts like an ENTER key in this mode. The PREHEAT temperature is the temperature to which the control will regulate the air and radiant heat elements during PREHEAT mode. For this parameter, the top display shows "PrHt" and the bottom display shows preheat temperature in degrees. Next, the top display shows "ST.=" (stage), and the bottom display shows a stage number. The displayed stage number is the stage that will be selected if the PROGRAM switch is pressed. If a PRODUCT switch (0–9) is pressed, followed by the PROGRAM switch, the control will immediately access the selected stage (0–9) for programming (step 905). For example, after the PREHEAT is programmed, the displays may show "St.=1." If the program switch is pressed here, the stage 1 programming is entered. Alternatively, if "5" is pressed followed by the PROGRAM switch, the control jumps to stage 5. If the selected stage is "0" (step 906), control returns to step 903, otherwise control proceeds to step 907. If the selected stage number (N) is not less than or equal to the maximum number of COOK stages (e.g. 10), control passes to step 908. Otherwise, it proceeds to step 908. In steps 908–913, the parameters for COOK stage N are selected. For purposes of example, it will be assumed that the Stage 1 parameters are being programmed.

First, the Stage 1 cook time is set (step 908). The Stage 1 COOK time is the total COOK time for a COOK cycle (all stages) in hours and minutes. All other COOK stage times are then set and displayed in terms of time remaining to the end of the COOK cycle. The top display shows "St.x," where "x" is the stage number and the bottom display shows stage time in hours and minutes.

The Stage 1 COOK time seconds is the total COOK time seconds. This time is added to the stage 1 COOK time in hours and minutes programmed above. This step can be skipped if it is only necessary to use hours and minutes. The left display shows "St.1," "sec." The right display shows ":xx," where "xx" is the time in seconds. The time can be set from 0 to :59

Next, the Stage 1 AIR TEMPERATURE setpoint is set (Step 909). This is the setpoint to which the air heat elements will be regulated during the stage. For this parameter, the display shows "Air," and the bottom display shows setpoint in degrees. The PRODUCT keys are used to select this temperature. Then, the Stage 1 FAN (blower) status may be set to ON, OFF or VENT (step 910). For this parameter, the top display shows "Fan," and the bottom display shows VENT, ON or OFF. Any PRODUCT key may be pressed to cycle the setting through VENT, ON, OFF, VENT, etc.

In steps 911–912, the RADIANT HEAT setpoint and its DUTY CYCLE are set. The Stage 1 RADIANT HEAT TEMPERATURE setpoint is the temperature limit for the radiant heat elements during the stage. The Stage 1 radiant heat DUTY CYCLE percent is the duty cycle that the radiant heat elements will be on during the stage. For this parameter, the top display shows "rAd," and the bottom display shows "xxx%," where "xxx" is the duty cycle in percent.

The control will cause the radiant heat elements to operate according to the programmed DUTY CYCLE when the air temperature is at or below this setpoint. The radiant heat will be off when the air temperature is above this setpoint. Top display shows "rAd°" and the bottom display shows the setpoint in degrees.

In step 913, the Stage 1 LOAD COMPENSATION FACTOR is set. This is the load compensation setting for the stage. 0 is minimum (no load compensation), and 10 is maximum load compensation. The load compensation adjustment is calculated based on the higher of the radiant and air temperature setpoints as discussed in connection with other embodiments. For this parameter, the top display shows "LdCo" and the bottom display, shows "LC:xx," where "xx" is the load compensation setting.

After stepping through all stage 1 parameters, the top display shows "St.=," and the bottom display shows the number of the next stage (step 914) and control returns to step 905, if this is not the last stage (step 915). Pressing the "P" switch at this point causes entry to the displayed stage number parameters. Alternatively, the desired stage number can be entered, and the entered stage is accessed. For example, after programming all stage 1 parameters, the display shows "St.=", "2." If "P" is pressed, programming continues with the stage 2 parameters. If, instead of pressing "P," 3 is entered, then "P" is pressed, programming continues with stage 3. Thus the user may set the parameters for stages 2–10 in substantially the same way. As noted above, however, the time set will be the time remaining in the COOK cycle when the stage is entered. After setting the desired parameters for stages 2–10, the HOLD stage parameters may be set (step 917), if desired.

The HOLD stage time is the total product HOLD time in hours and minutes. For this parameter, the top display shows "Hold" and the bottom display shows the total HOLD time in hours and minutes. If the HOLD time is set to 0:00, then the HOLD parameters will not appear during programming. The HOLD stage time SECONDS is the HOLD stage time seconds which are added to the HOLD time hours and minutes, programmed above. For this parameter, the top display shows "HOLD", "sec" and the bottom display shows the HOLD time seconds. The HOLD stage AIR TEMPERATURE setpoint is the temperature to which the air heat elements are regulated during the HOLD stage. For this parameter, the top display alternates "Hold," Air° and the bottom display shows the AIR TEMPERATURE setpoint in degrees. The HOLD stage FAN status is the fan status during the HOLD stage. For this parameter, the top display alternates "Hold," "FAN" and the bottom display shows VENT, ON, or OFF. Any PRODUCT key may be pressed to cycle through VENT, ON, and OFF. The HOLD stage radiant heat DUTY CYCLE percent is the duty cycle that the radiant heat elements will be on during the HOLD stage. For this parameter, the top display alternates "Hold," "rAd" and the bottom display shows duty cycle in percent. The HOLD stage RADIANT HEAT setpoint is the temperature to which the radiant heat elements are regulated during the HOLD stage. For this parameter, the Top display alternates "Hold," "rAd°" and the bottom display shows the setpoint in degrees. The HOLD stage LOAD COMPENSATION FACTOR is the load compensation setting for the HOLD stage. For this parameter, the Top display alternates "Hold," "LdCo" and the bottom display shows "LC:xx," where "xx" is the load compensation setting. The load compensation can be set from 0 to 10. 0 is no load compensation, 10 is maximum load compensation.

As noted above, various alarms may be set (steps 918–920). Alarm 1 time, in hours and minutes is set in terms of the time remaining in the COOK cycle. For this parameter, the top display shows "AL x," where x=1 for alarm 1, 2 for alarm 2, etc. The bottom display shows the alarm time in hours and minutes. If all alarms are set to 0:00, the remaining alarms will not be displayed in PROGRAM mode. If more than one alarm is not set to 0:00, then only one "0:00" alarm will be shown. For example, if alarm 1 is 1:00, alarm 2 is :40, and alarms 3 and 4 are zero, then only alarms 1, 2 and 3 will be shown during programming.

The ALARM 1 time, SECONDS is the number of seconds which is added to the alarm 1 time hours and minutes, programmed above. This step can be skipped if it is only necessary to set the alarm time in hours and minutes. For this parameter, the top display shows "AL 1," "sec" and the bottom display shows the alarm time seconds. The seconds can be set from 0 to :59. Similarly, Alarms 2–4 may be set.

When programming the stage parameters, the top display alternates between displaying "St. x," and the parameter label, where "x" is the stage number. This acts as a reminder of which stage is being programmed.

During programming, preferably the numeric parameters are entered by using the PRODUCT keys as a numeric keypad. For example, to enter "400," the keys 4, 0 and 0 are pressed. Mistakes in parameter entry are cleared by pressing the "0" key until the display shows all zeros. The correct parameter can be entered at this point. Other known data entry techniques may also be used.

To prevent errors and for other reasons, parameter limits and resolution may be fixed. For example, COOK, HOLD and ALARM times between 0:00:00 and 18:00:00, with one second resolution are reasonable limits. For temperatures 140° to 425° F., with one degree resolution, are reasonable limits. For radiant heat duty cycle 0 to 100%, with 1% resolution are reasonable limits. For load compensation settings of 0 to 10, with 1 unit resolution.

If a parameter is entered that exceeds the parameter limits, an error message is sounded. The error message occurs when the PROGRAM switch is pressed to advance to the next item. If the value is too low, the bottom display flashes "too Lo," then the previous value of the parameter is shown. If the value is too high, the display flashes "too Hi." In either case, the top display shows the parameter prompt. It is not possible to advance to the next parameter until a valid parameter is entered.

PROGRAM mode can be exited at any time by pressing and holding the "Program" switch. PROGRAM mode will be exited automatically if no switches are pressed for 60 seconds, or some other predetermined time.

If no HOLD stage is required, the HOLD time can be set to zero. Similarly, if no alarms are required, all alarm times can be set to zero. Since all of the various stage parameters can be set for the HOLD stage, this means, for example, that HOLD mode can be programmed so that only radiant heat is used with no air heat as described above or vice versa. To skip past all COOK stage settings, directly to HOLD and alarm settings, a stage number greater than 10 (for example, 11 or 15) is entered when the top display shows "St.=" (step 905).

To COOK or HOLD with only radiant heat, and no air heat, the AIR TEMP setpoint can be programmed to a very low value, and the radiant heat setpoint can be programmed to the desired regulation point, with the radiant heat duty set as wide as required. To COOK or HOLD with only air heat, and no radiant heat, the radiant heat duty cycle is set to zero. In this case, the radiant heat setpoint does not matter.

Figure 9A:
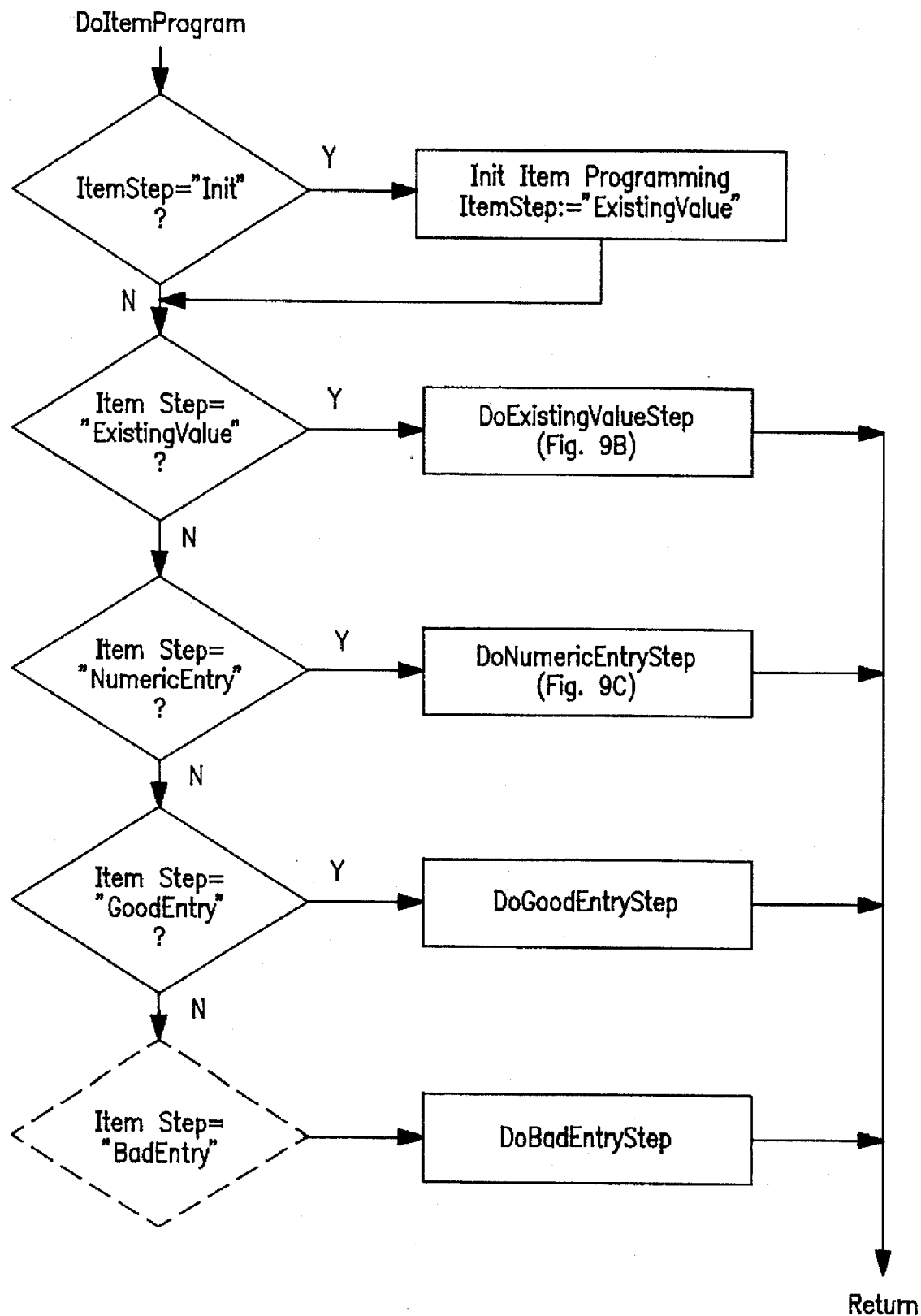
FIG. 9A-9E are subroutines performed during PROGRAM mode.
Figure 9B:
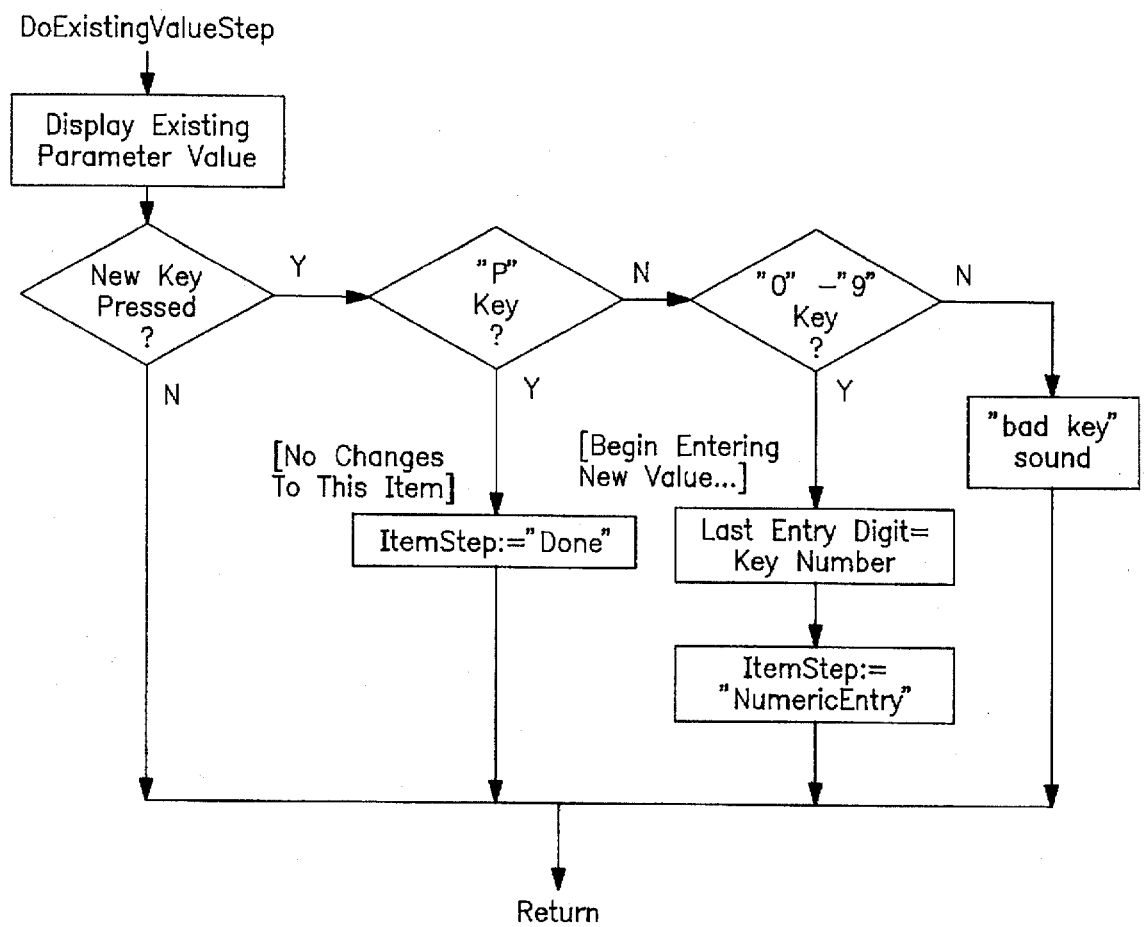
Figure 9C:
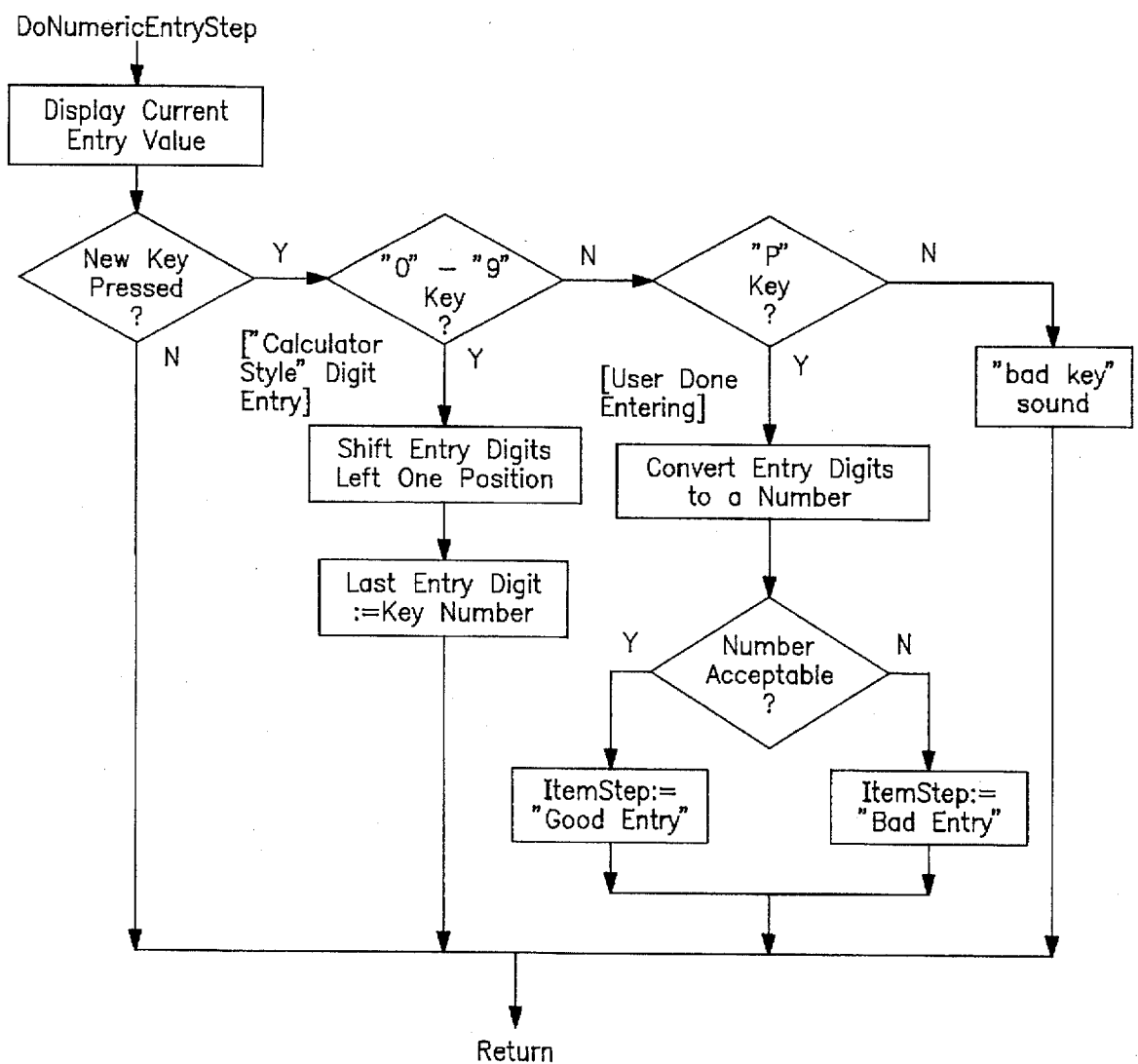
Figures 9D, 9E:
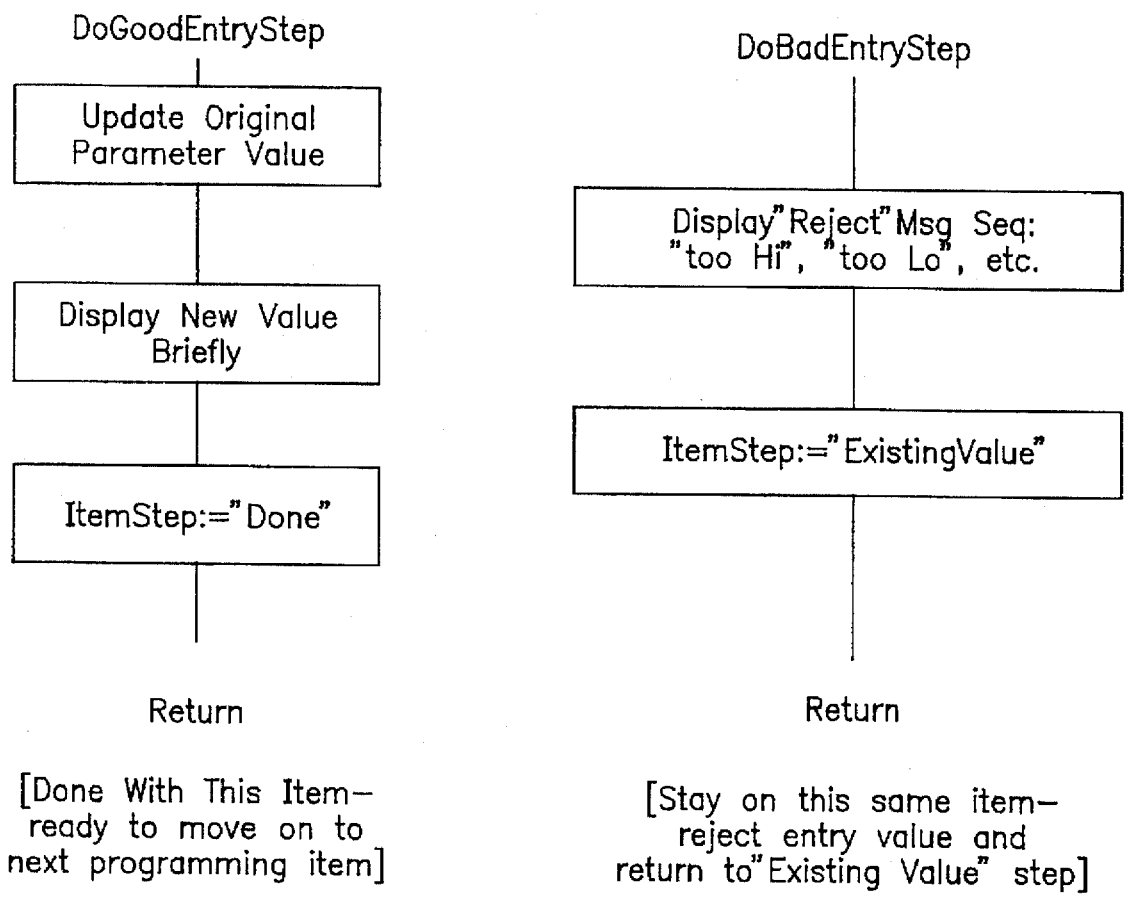

In PROGRAM mode, data may be entered in various ways. For example, as shown in FIGS. 9A–9E, the item (parameter) displayed will generally be displayed with an existing value or is initialized to set an "existing value." Selection of the existing value is performed as shown in FIG. 9B. Entry of a numeric value is performed as shown in FIG. 9C. If an entry is a "good entry" (e.g. a valid entry) the good entry routine is performed as shown in FIG. 9D. If a bad entry (e.g. invalid entry) the routine of FIG. 9E is performed.

By way of example, an excerpt of a software routine for enabling items (e.g. parameters) to be programmed with data values is provided in pages 7–46 of Microfiche Appendix B. An example of software routine which may be used during programming is provided in pages 47–107 of Microfiche Appendix B.

To operate the controller, the POWER switch is turned to the ON position and the control executes serf-tests. All displays are blank during internal serf-tests, which may take 2–4 seconds. After serf-tests are done, all displays and LEDs turn on briefly, and the speaker sounds an alarm, for example, 5 short beeps. Then, the top display scrolls "SELECT Product," to indicate that a product must be selected. All outputs (heat, fan, rotor, etc.) are OFF until a product is selected.

When the top display shows "SELECT product," a PRODUCT key (0–9) is pressed to select the desired product and the associated PRODUCT LED turns on. The control then begins to regulate the air to the PREHEAT temperature. The Top display flashes "Pre-," "HEAT," and the bottom display shows the air temperature in the cavity. A different product can be selected by pressing the associated PRODUCT key. Otherwise, the control begins a heater response test when the product is selected, during the PREHEAT stage. If the air temperature does not reach a predetermined temperature, for example, 150° F. within a predetermined time, for example, four minutes of product selection, then the control shows the message "Heat error" in the top display. This signals that there is some sort of error. Otherwise, the heat remains on, and normal operation can continue.

During PREHEAT, preferably the air heat and radiant heat are both turned on to regulate the air temperature in the cooking chamber to the programmed PREHEAT setpoint. Preferably, the air heat and radiant heat are independently controlling during PREHEAT, COOK and HOLD. Independent control of different types of heaters is disclosed, for example, in U.S. Pat. No. 5,182,439 which is incorporated herein by reference. Other examples of PREHEAT control are disclosed in U.S. Pat. No. 5,296,683. During PREHEAT, preferably, the blower (fan) runs continuously, the rotor is always off and the vent is always closed. An excerpt of the PREHEAT subroutine is provided in pages 108–118 of Microfiche Appendix B.

The READY LED turns on when the air temperature in the cavity is within 10° F. of the setpoint (but this can be changed in the SPECIAL PROGRAM mode.) This prompts the user to load the product. After the product is loaded, the user presses the desired PRODUCT switch to start the timer and enter the COOK mode. The top display shows time remaining in hours and minutes, until less than one hour remains. When less than one hour remains, the top display shows the time remaining in minutes and seconds. The bottom display shows the air temperature in the cavity. Also, the COOK LED turns on and the ROTOR starts turning automatically when the COOK timer is started.

In COOK mode, the selected PRODUCT is cooked during a COOK cycle. A COOK cycle is made up of one or more COOK stages or intervals and optimally, a HOLD stage. During a COOK cycle, the air heating elements are regulated according to the programmed AIR HEAT setpoint for each stage within the COOK cycle. The air heating elements are ON as long as the air temperature is less than the programmed AIR HEAT setpoint. If the air temperature is above the AIR HEAT setpoint, the air heating elements are turned OFF. Additionally, the radiant heat elements are pulsed at the programmed DUTY CYCLE as long as the air temperature in the cooking chamber is less than the programmed RADIANT HEAT setpoint. If the air temperature is above the RADIANT HEAT setpoint, the radiant heat elements are turned off. The spit motor (also called the rotor) is turned on during the COOK cycle. The blower (or fan) is regulated according to the programmed FAN setting for each stage of the COOK cycle. The blower (fan) can be programmed to one of three settings during a COOK cycle stage: ON, OFF or VENT. The ON setting causes the fan to run continuously with the vent closed. The VENT setting causes the fan to run continuously with the vent open. The OFF setting causes the fan to be OFF, except for a short period of time in which it will pulse on. For example, in the OFF state, the fan may pulse ON for 10 seconds every 2 minutes. This pulsing operation is desirable to enable a good sample of the cavity (cooking chamber) air temperature to be obtained, and to assist in cooling the control compartment. Additionally, the fan will turn ON whenever the air heat is ON, regardless of the programmed FAN stage setting. This is desirable to ensure heat transfer from the air heat elements to avoid damage. Additionally, whenever the door (or one of the doors) to the cooking chamber is open, the blower is turned OFF. This is done for safety and efficiency reasons.

Alarms during the COOK cycle cancel themselves. Alternatively, they can be cancelled by pressing the PRODUCT switch. During an alarm, the bottom display flashes "AL x," where "x" is the alarm number. The top display continues to show the COOK time remaining. The speaker sounds as the display flashes. Preferably, there are a total of 5 flashes.

If either or both doors are opened during the COOK cycle, preferably all process outputs are turned OFF and remain OFF until both doors are again closed. A door open detector of a known type may be used to detect these occurrences. Both displays are used to flash the "door open" message. The COOK timer keeps running while the doors are open, but the load compensation feature adjusts the COOK time accordingly due to the likely drop in temperature while the door(s) is open. Alternatively, the COOK timer is paused while the door is open.

To abort a COOK cycle, a user presses and holds the PRODUCT switch until the display shows "Select product." Otherwise, at the end of the COOK cycle, the top display flashes "0:00" and the bottom display flashes "DONE." The product LED also flashes and an alarm sounds. This prompts the user to push the PRODUCT switch to stop the alarm. The rotor stops automatically when the alarm is acknowledged. If no HOLD time is programmed, all process outputs turn OFF and the top display scrolls the "SELECT Product" message. If a HOLD time is programmed, it is not necessary to push the PRODUCT switch to stop the alarm—the alarm will sound and the HOLD mode will automatically be entered. In this case, at the end of the HOLD cycle, the top display flashes "0:00" and the bottom display flashes "Hold," "End." The speaker executes the end-of-hold (EOH) alarm, which is audibly different from the end-of-cycle (EOC) alarm. Again, the user presses the PRODUCT switch to stop this alarm. The ROTOR continues to turn until the EOH alarm is acknowledged. When the alarm is acknowledged, all outputs are turned off and the display displays "SELECT product."

If power is removed from the control at any time, the control will power up again, execute the self-tests, then resume the operation that was active at power-down. If a COOK cycle was timing, then the control will resume the COOK timer. If PREHEAT was active, then PREHEAT will be resumed.

In operation, the control uses the stored parameters for each stage of a COOK cycle to COOK and HOLD product. This is accomplished primarily by controlling the air heat elements, the radiant heat elements, the blower and the rotor in connection with running and monitoring the COOK timer (and other timers) and based on the probed temperature. By way of example, these operations are described below.

Figure 10:
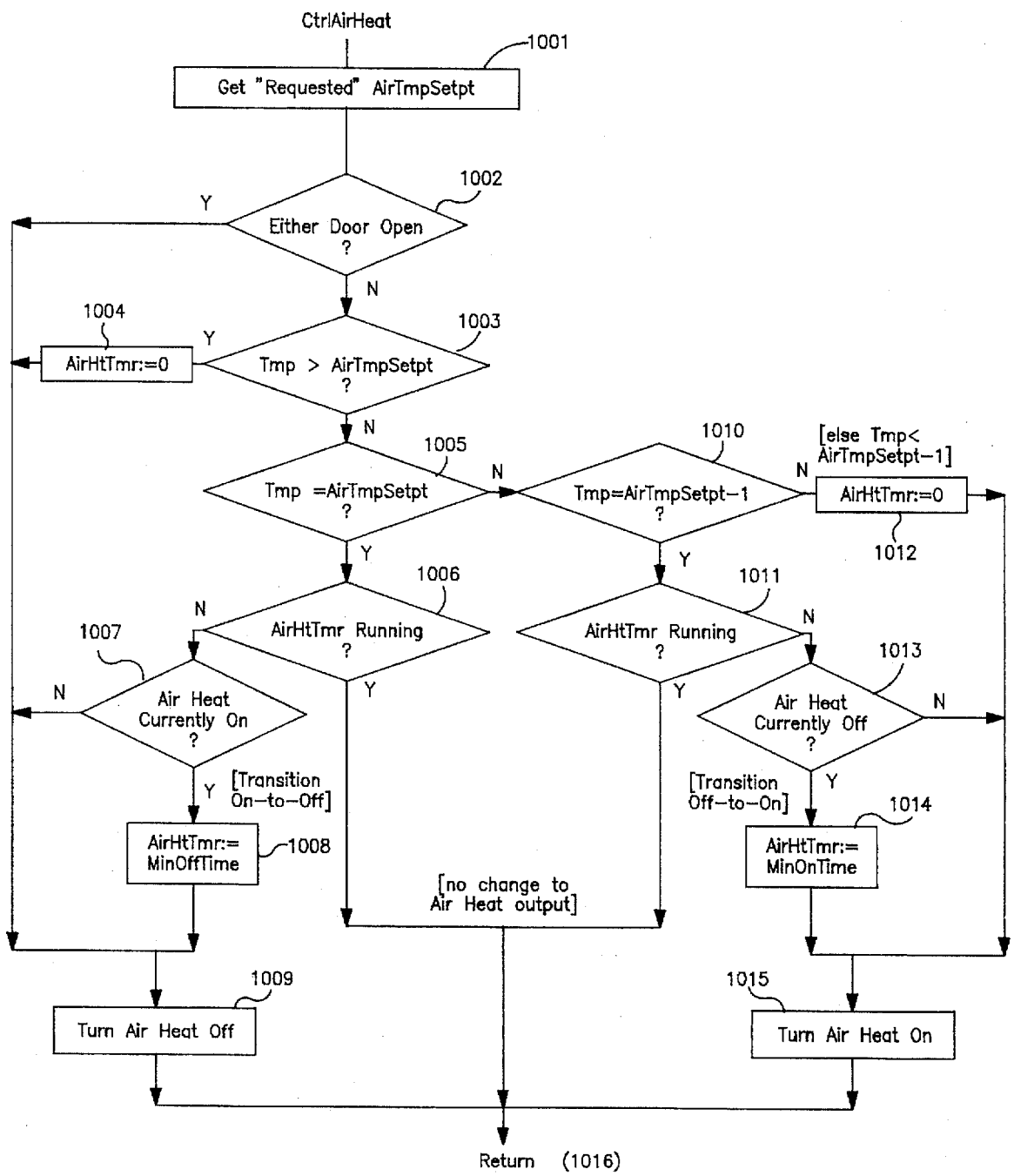
FIG. 10 is a flow chart of the AIR HEAT control.

As shown, for example, in connection with FIG. 10, the operation of the Air Heat is described. First, the AIR temperature setpoint for the current stage is obtained (step 1001). Then it is determined whether the (or either) door is open (step 1002). If a door is open the air heat elements are turned OFF (step 1009). Otherwise, it is determined whether the probed temperature is greater than the AIR setpoint temperature (step 1003). If yes, control passes to step 1004 and if not, control passes to step 1005. In step 1005, it is determined whether the probed temperature is equal to the AIR setpoint temperature. If no, control passes to step 1010, if yes, control passes to step 1006. In step 1006, it is determined whether the AIR HEAT TIMER is running. If it is, there is no change to the AIR HEAT output of the controller and control returns to the beginning of the subroutine (step 1016). If the AIR HEAT TIMER is not running, control passes to step 1007. In step 1007, it is determined if the AIR HEAT is ON. If it is not, control passes to step 1009. If it is ON, the AIR HEAT TIMER (off time) is set (step 1008), the AIR HEAT is turned OFF (step 1009) and control passes to step 1016. The AIR HEAT TIMER is used to limit the contactor cycling at the transition temperatures. From steps 1004 and 1007, control passes to step 1009.

If control passes from step 1005 to step 1010, it is determined whether the probed temperature is equal to the AIR setpoint-1. If not, control passes to step 1012. However, if it is, control passes to step 1011, where it is determined whether the AIR HEAT TIMER is running. If it is running, there is no change to the AIR HEAT output and control passes to step 1016. If the AIR HEAT TIMER is not running (step 1011), it is determined whether the AIR HEAT is currently OFF (step 1013). If it is, the AIR HEAT TIMER (on time) is set (step 1014), the AIR HEAT is turned ON (step 1015) and control passes to step 1016. From step 1012 or if the response is negative to step 1013, control passes to step 1015.

By way of example, pages 119-124 of Microfiche Appendix B provide an excerpt of a software routine that may be used to control the AIR heat elements of a cooking appliance.

Figure 11:
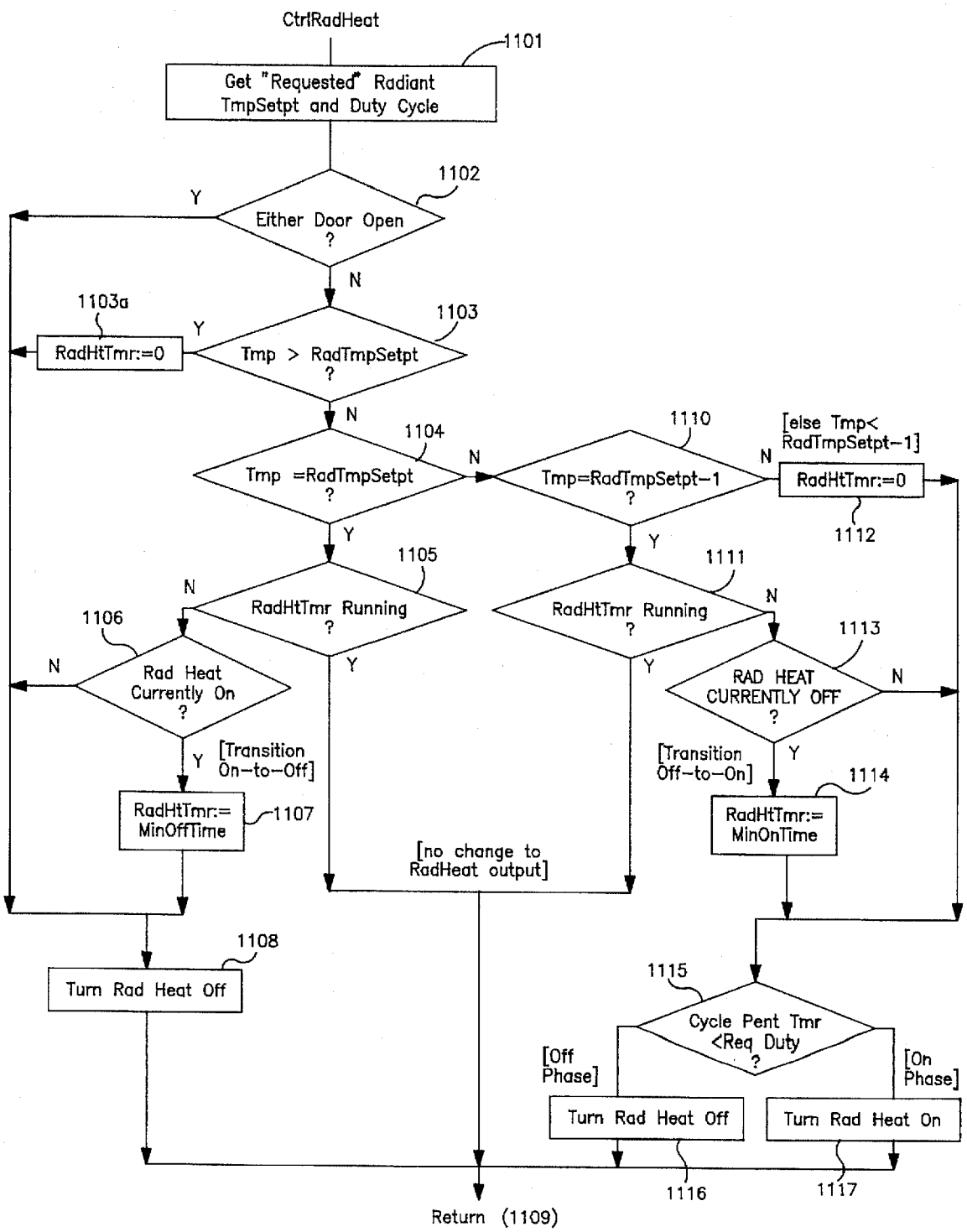
FIG. 11 is a flow chart of the RADIANT HEAT control.

As shown, for example, in FIG. 11, the operation of the RADIANT HEAT element(s) is described. First, the programmed RADIANT HEAT setpoint and DUTY CYCLE are obtained (step 1101). Then it is determine whether a door is open (step 1102). If a door is open, the RADIANT HEAT is turned OFF (step 1108) and control passes to step 1109 which causes control to return to the beginning of the subroutine. If a door is not open, it is determined whether the probed temperature is greater than the RADIANT HEAT setpoint (step 1103). If yes, a RADIANT HEAT TIMER is set to "0" (step 1103a) and control passes to step 1108. If no, it is determined whether the probed temperature equals to the RADIANT HEAT setpoint (step 1104). If no, control passes to step 1110. If yes, it is determined whether the RADIANT HEAT TIMER is running (step 1105). If it is running, there is no change to the RADIANT HEAT output of the control and control passes to step 1109. If the RADIANT HEAT TIMER is not running (step 1105), it is determined whether the RADIANT HEAT is currently ON (step 1106). If not, control passes to step 1108, otherwise the RADIANT HEAT TIMER (off time) is set (step 1107), the RADIANT HEAT is turned OFF (step 1108) and control passes to step 1109.

In step 1110, it is determined whether the probed temperature equals the RADIANT HEAT setpoint-1. If not, control passes to step 1112, otherwise it is determined whether the RADIANT HEAT TIMER is running (step 1111). If it is running, there is no change to the RADIANT HEAT output and control passes to step 1109. If the RADIANT HEAT TIMER is not running (step 1111), it is determined whether the RADIANT HEAT is currently OFF (step 1113). If it is OFF, the RADIANT HEAT TIMER (on time) is set (step 1114) and control passes to step 1115. If it is ON (step 1113), control passes directly to step 1115. In step 1115, it is determined whether a cycle percent timer value is less than the requested DUTY CYCLE. If it is not, the RADIANT HEAT is turned OFF (step 1116) and control passes to step 1109. If it is, the RADIANT HEAT is turned ON (step 1117) and control passes to step 1109.

By way of example, pages 125-131 of Microfiche Appendix B provide an excerpt of a software routine that may be used to control the radiant heat elements of a cooking appliance.

Figure 12:
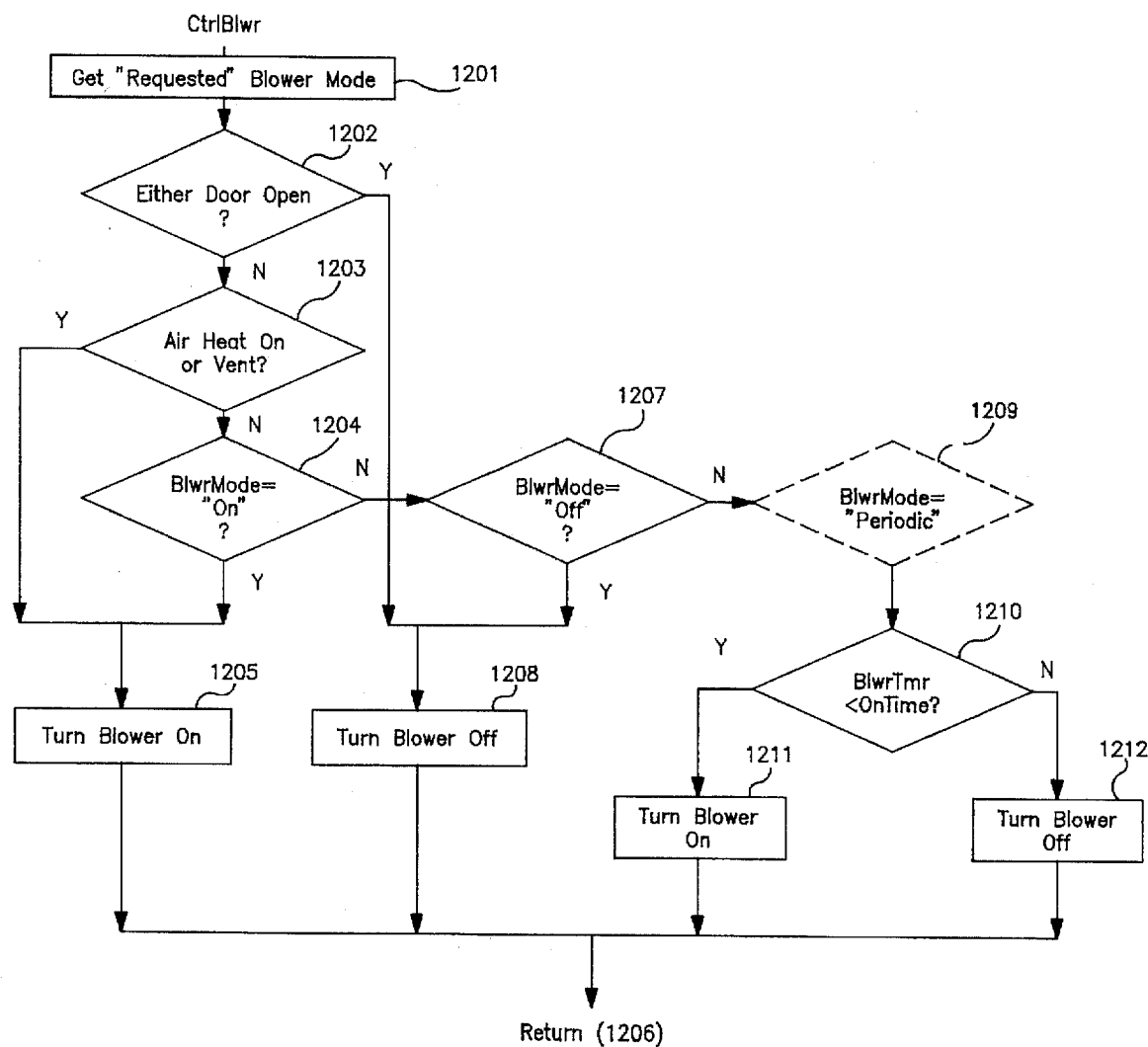
FIG. 12 is a flow chart of a method of operating the BLOWER.

As shown, for example, in FIG. 12, the blower (FAN) may be operated as follows. The blower mode or setting for the current stage is obtained (step 1201). Then it is determined whether a door is open. If a door is open, the blower is turned off (step 1208) and control passes to step 1206. If not, it is determined whether the AIR HEAT is ON or if the vent is open. If yes, the blower is turned ON (step 1205) and control passes to step 1206. If the AIR HEAT is not ON (step 1203), it is then determined whether the blower setting for the current stage is ON (step 1204). If yes, the blower is turned ON (step 1205). Otherwise, it is determined whether the blower setting is OFF (step 1207). If yes, the blower is turned OFF (step 1208) and control passes to step 1206. If the response in step 1207 is no, the blower setting may be a periodic pulse mode (step 1209), in which case it is determined whether a blower timer is less than the ON time for the blower timer (step 1210). If it is, the blower is turned ON (step 1211), if not, the blower is turned OFF (step 1212). From steps 1211 and 1212, control passes to step 1206.

In another embodiment the blower (FAN) may be operated as follows. Three modes of operation are provides; HI, LO, and OFF. When the fan is in HI mode, the fan operates continuously. The fan is preferably is HI mode whenever AIR HEAT is on and generally for a predetermined period of time after AIR HEAT is turned off. The fan is also operated in HI mode whenever the temperature in the cooking cavity exceeds a predetermined temperature such as, for example, about 200° F. The fan operates in HI mode to circulate air in the control compartment housing the control equipment to prevent the control equipment from overheating. Other predetermined temperatures may also be selected depending on the sensitivity of the control equipment being used.

When the fan is in LO mode, the fan is pulsed on for a first predetermined period of time every second predetermined time. Preferably, the first and second predetermined times are selected so that the fan blades turn at a slow, relatively constant speed. For example, the fan may be pulsed on for about one second every about ten seconds, or so. Thus, LO mode provides a relatively continuous low speed fan while utilizing a much smaller amount of power.

Preferably LO mode is brought about by the following method. The fan is pulsed on for a first predetermined period of time. Then the power to the fan is turned off. The inertial motion of the fan blades causes the blades to continue to move. Friction causes the blades to rotate at a decreasing rate. Before the blades come to a complete stop, the fan is again pulsed on for the first predetermined period of time. The time between the initiation of the first pulsing and the initiation of the second pulsing is the second predetermined period of time.

During OFF mode, the fan is generally not operating. For example, whenever the door to the cooking cavity is open, the fan is preferably OFF. However, it may be advantageous even in OFF mode to turn the fan on for a third predetermined amount of time every fourth predetermined amount of time. For example, during OFF mode, the fan may be turned on for about ten seconds every about two minutes.

When the AIR HEAT is OFF, the fan may be operated in a slow or pulsed mode to prevent air stratification and overdrying of prepared food. For example, after food has already been cooked, the cooking apparatus may be in HOLD mode. In HOLD mode, food may be held in the cooking cavity until it is served. As such, the air in the cavity may stratify, causing some food articles or parts of food articles to receive more heat than others.

Therefore, according to the present invention, the fan may be operated in LO mode when the AIR HEAT is OFF, such as during HOLD mode. By operating the fan in LO mode, product quality and holding time are improved. Food may be maintained for a longer time without drying out and thus a higher quality food product is produced. Temperature stratification in the cooking cavity is lessened as a result of the relatively continuous low-speed airflow. Additionally, this fan mode provides improved temperature regulation.

Figure 14:
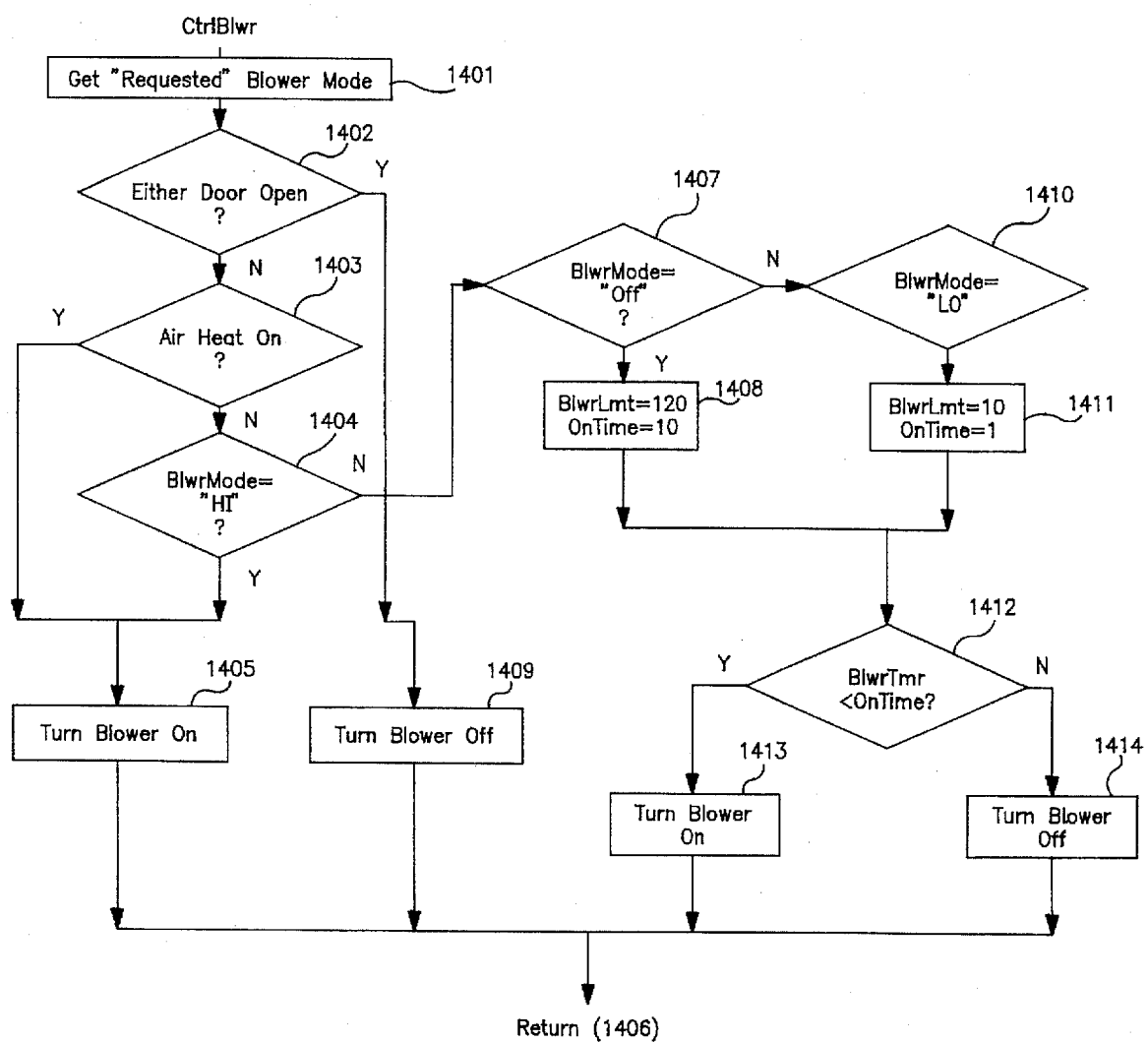
FIG. 14 is a flow chart of another method of operating the BLOWER.

One embodiment of this fan control method is depicted in FIG. 14, for example. The blower (FAN) may be operated as follows. The blower mode or setting for the current stage is obtained (step 1401). Then it is determined whether a door is open. If a door is open, the blower is turned off (step 1409) and control passes to step 1406. If not, it is determined whether the AIR HEAT is ON. If yes, the blower is turned ON (step 1405) and control passes to step 1406. If the AIR HEAT is not ON (step 1403), it is then determined whether the blower setting for the current stage is HI (step 1404). If yes, the blower is turned ON (step 1405). Otherwise, it is determined whether the blower setting is OFF (step 1407).

If the blower is in OFF mode, the counting limit for the blower, BlwrLmt is set to 120 seconds and the time for which the blower is to be turned on, OnTime, is set to about 10 seconds (step 1408). Other times could be used as well. Control then passes to step 1412 to determine if the counter for the blower is less than the OnTime. If so, the blower is turned on (or left on) (step 1413). If not, the blower is turned off (step 1414). From steps 1413 and 1414, control passes to step 1406.

If the response in step 1407 is no, the blower setting is in LO mode (step 1410) and in step 1411, BlwrLmt is set at 10 seconds and OnTime is set at one second. Other times may also be used. Control then passes to step 1412, either 1413 or 1414, and 1406.

In general, one fan operates to both cool the control components in the control compartment and to circulate air in the cooking cavity. In this embodiment, the fan comprises two blade wheels. One blade wheel moves air in the cooking cavity and the other moves air in the control compartment. The two blade wheels may be connected by a shaft. In this embodiment, the fan is operated to both prevent overheating and to prevent stratification.

In another embodiment, two fans may be provided. In this embodiment, one fan cools the control components and may be operated to prevent control component overheating. Therefore, this fan may be operated in HI mode whenever the temperature rises above about 200° F., for example. A second fan may be provided to circulate air in the cooking cavity and may be operated to prevent stratification and to circulate air during the cooking process. This fan may be in HI mode whenever the temperature in the cooking cavity rises above a predetermined temperature such as about 250° F., for example.

Pages 132–136 of Microfiche Appendix B contain an example of an excerpt of a software routine that may be used to control the fan of a cooking appliance. Pages 389–398 of Microfiche Appendix B contain another example of a software routine that may be used to control the fan of a cooking appliance.

Similarly, the rotor and vent may be controlled. For example, if a door is open, the rotor may be OFF and the vent closed. Preferably, whenever the control is in a COOK or HOLD mode, the rotor is ON. Otherwise, it should be OFF (unless control is overridden by manual rotor control). The vent position (open or closed) may be responsive to the programmed vent setting. Alternatively, a manual or automatic override may be used. For example, automatic override may be used to open the vent if the humidity (or some other sensed parameter) as sensed by a humidity sensor located in or in communication with the cooking chamber exceeds a predetermined level.

By way of example, excerpts of software routines for controlling the rotor and vent according to one embodiment of the present invention are provided in pages 137–144 of Microfiche Appendix B.

Figure 13:
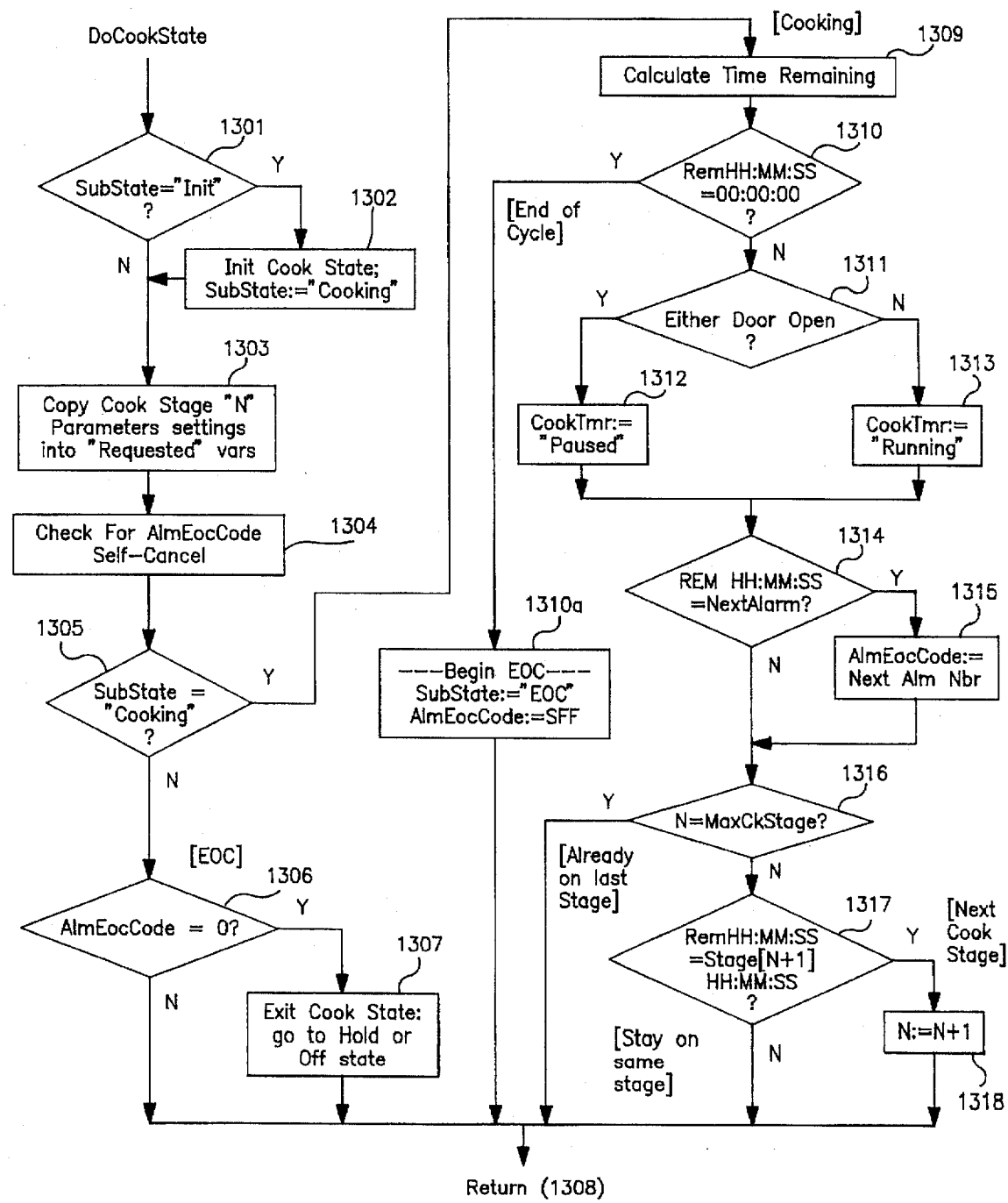
FIG. 13 is a flow chart of the COOK mode control.

In the COOK mode, the control performs the general procedure shown in FIG. 13. If the COOK state is not already initialized (step 1301), it is initialized (step 1302) and control passes to step 1303. In step 1303, the parameter settings for COOK stage N are copied into the "Requested Variables" Then the end of cycle (EOC) code check is performed (step 1304) and control passes to step 1305, where it is determined whether the substrate is "cooking." If it is, control passes to step 1309. Otherwise, it is determined whether the alarm EOC code is "0" (step 1306). If it is, the COOK state is exited, the HOLD or OFF state is entered (step 1307) and control passes to step 1308. If not, control passes directly to step 1308 which is a return step. In step 1309, the time remaining in the cook cycle is determined. Next, it is determined if the time remaining is 00:00:00 (step 1310). If yes, this is the end of cycle (EOC) and an EOC routine is performed (step 1310a) and control passes to step 1308. If the time remaining is not 00:00:00 (step 1310), it is determined if a door is open (step 1311). If a door is open, the timer is paused (step 1312). Optionally, however, the timer may continue to run, especially if load compensation is being used. In any event, if the door is not open (or the timer pause step is skipped) the COOK timer is running (step 1313). In either case, control passes as shown to step 1314 where it is determined whether the remaining time equals a programmed ALARM time. If yes, the alarm EOC code is set to the next alarm amber (step 1315) and control passes to step 1316. If not, control passes directly to step 1316. If the COOK stage (N) is already the last stage (step 1316) control passes to step 1308. Otherwise, it is determined if the remaining time equals the time set for the next (N+1) stage (step 1317). If it is, N is incremented (N=N+1) (step 1318) and control passes to step 1308. If not, control passes to step 1308 and the current stage continues.

By way of example, an excerpt of a software routine for performing these functions and associated displays and key inputs is set forth in pages 145–181 of Microfiche Appendix B.

At the end of a cook cycle, the HOLD mode may be entered. An example of a software routine which may be performed in HOLD mode for cooking appliance is provided in pages 182–204 of Microfiche Appendix B.

According to another feature of this embodiment, a SPECIAL PROGRAM mode is used to set parameters that are not changed very often, and are more system-oriented than the PRODUCT parameters. SPECIAL PROGRAM mode is entered by pressing and holding the PROGRAM switch for a predetermined period of time until the displays show "SPCL," "Prog." The top display then shows "Code," indicating that the control is waiting for the user to enter the access code. The behavior if the code is not entered, or is entered incorrectly, is the same as that described in the PROGRAM MODE section above.

On entry to SPECIAL PROGRAM mode, the PROGRAM mode message ("Prod Set") will be displayed first. By continuing to hold the PROGRAM key until "SPCL Prog" is displayed SPECIAL PROGRAM mode can be exited at any time by pressing and holding the PROGRAM switch. SPECIAL PROGRAM mode will be exited automatically if no switches are pressed for a predetermined time, for example, one minute. Prior to this latter mentioned predetermined time, for example, at 50 seconds, the control causes the speaker to beep to alert the user that SPECIAL PROGRAM mode is about to be exited. Once SPECIAL PROGRAM mode is entered, the PROGRAM switch is used to step through the parameters that may be set and/or displayed. The top display shows a parameter label, and the bottom display shows the current setting.

SPECIAL PROGRAM mode is used, for example, to set or display the following items:

1. Temperature display/programming units: ° F. or ° C. The top display shows "deg." The bottom display shows the current setting. Any key may be pressed to toggle the temperature units.

2. Probe calibration. The top display shows "Calib." The bottom display shows the current air temperature. The desired air temperature is entered using the PRODUCT switches. The air temperature can be set +/−15 degrees Fahrenheit from nominal to take into account component tolerances, etc.

3. Speaker volume. The top display shows "Loud." The bottom display shows the current setting. The desired volume setting is entered with the PRODUCT keys. The volume can be set from 1 to 10. 1 is minimum volume, 10 is maximum volume. When the PROGRAM key is pressed, the speaker will sound the frequency for three short beeps. If this setting is satisfactory, the PROGRAM switch is pressed to advance to the next item.

4. Speaker frequency. The top display shows "tone," and the bottom display shows the current frequency in Hz. The frequency can be set from 50 to 2000 Hz or some other suitable range. When the PROGRAM key is pressed, the speaker will sound the frequency for three short beeps. If this setting is satisfactory, the PROGRAM switch is pressed to advance to the next item.

5. READY LED range limits. The READY LED range limits are programmed in two steps—the upper limit and the lower limit. The two limits need not be symmetrical about the setpoint. When programming the upper limit, the top display shows "rdy," and the bottom display shows the upper limit in degrees. When programming the lower limit, the top display shows "-rdy," and the bottom display shows "-xx," where "xx" is the lower limit in degrees. The desired limits are entered with the PRODUCT keys. The limits can be set from 0° to 25° F., or other suitable values.

6. Usage values. This keeps track of a product usage, by product, in cycles. The top display shows "USED." The bottom display shows the number of times the cycle was cooked since the count was last reset. The PRODUCT keys are pressed to display the usage for the different products. The product LED turns on to show which product is selected. To reset the usage to zero the PRODUCT switch is pressed to select the product, then it is released and pressed again and held until the display flashes, then shows 0.

7. Control ambient temperature, current and maximum. The bottom display shows "CPU," and the top display shows the current control ambient temperature. The maximum ambient temperature recorded by the control can be displayed by pressing and holding the "1" PRODUCT switch. In this case, the top display shows "Hi=," and the bottom display shows the maximum recorded ambient. To reset this maximum, the "1" and "0" PRODUCT keys are pressed and held simultaneously.

8. System initialization. This step is used to initialize a parameter RAM to the product constants stored in the program EPROM. The top display shows "init," and the bottom display shows "sys." Any PRODUCT key may be pressed and held to initialize the RAM. As the switch is held, the displays flash "init in x," where "x" is the number of seconds remaining until initialization. "X" starts at 5 seconds. The speaker sounds during this display. To abort the initialization, the key is released. If the key is held until the system is initialized, then the control does a complete reset after initializing the parameter RAM. After the usual power-up sequence, the displays will show "SYS init" for one second as the speaker sounds.

An example of an excerpt of the software routines used in SPECIAL PROGRAM mode is provided in pages 205–240 of Microfiche Appendix B.

Other parameter data may be logged as well. These may be accessed in SPECIAL PROGRAM mode or in another convenient way.

For example, the control may log individual variables (e.g. usage statistics, e.g., for individual components, cycles and stages) and overall system items (number of times powered-up, initialized, etc.). Preferably, the logging is provided through use of a system event log. This log may be a record-keeping system implemented by the control software. Preferably the system event log records such events as error occurrences, rotisserie power up and power down, entry into PROGRAM mode and SPECIAL PROGRAM mode, cooking parameter initializations, and invisible RAM data files. The system event log may then be accessed by service personnel to determine the functioning of the oven. In one embodiment, it may be desirable to limit the number of events stored in the event log to reduce the amount of memory used for this feature. A limit may be set by event, for example. Thirty events may be stored in one embodiment. An example of a subroutine for logging such parameters in a cooking appliance is provided in pages 241–246 of Microfiche Appendix B.

The control implements several self-tests and error messages. When an error occurs preferably the speaker sounds continuously at the maximum volume. Pressing any key turns the speaker off. The top display shows a standard error code, and the bottom display flashes a description of the error. All process outputs are turned off. The error display continues until the error is cleared. Timers keep running during error conditions. For example, some errors which may occur are:

| | |
|---|---|
| "Prob Err" | The air temperature probe has opened or shorted. |
| "ctrl hot" | Control ambient temperature limit exceeded. |
| "CPU Chip" | Internal CPU RAM error. |
| "-rA- CHIP" | External RAM error. |
| "-ro- CHIP" | External ROM error. |
| "dAtA Err" | Data corruption error. |
| "too hot" | Software high limit (excessive air temperature). |

An example of excerpts of the software routines relating to ERROR MESSAGES is provided in pages 247–265 of Microfiche Appendix B.

SYSTEM INITIALIZATION SETTINGS

By way of example, the control may set the various parameters for each product to the following values after a system initialization.

| | |
|---|---|
| Preheat | 375° F. |
| Stage 1 time | 0:55 |
| Stage 1 air temperature | 360° F. |
| Stage 1 fan | on |
| Stage 1 radiant heat | 100% |
| Stage 1 radiant temperature setpoint | 360° F. |
| Stage 1 load compensation | 0 |
| Stages 2–10 time | 0:00 |
| HOLD time | 0:00 |
| HOLD air temperature setpoint | 200° F. |
| HOLD fan | on |
| HOLD radiant heat | 100% |
| HOLD radiant temperature setpoint | 200° |
| HOLD load compensation | 0 |
| Alarm 1 | 0:01 |
| Alarms 2–4 | 0.00 |

Of course, other settings may be used.

The TEST mode enables a user (or preferably a service technician) to check the operation of the components individually without having to actually enter a PREHEAT COOK or HOLD stage. It enables the components to be checked directly by operation of the control panel. Preferably, entry to this mode requires a special access code. An example of an excerpt of a software routine for operating a cooking appliance in this mode is provided in pages 266–326 of Microfiche Appendix B.

An example of a software routine for operating the speaker in a cooking appliance is provided in pages 327–352 of Microfiche Appendix B.

According to another feature, the programmable parameters may be stored in a checksum-protected data area to check the integrity of the data. A second copy of this data is maintained as a back-up and is Used to restore the primary data area whenever the primary data is corrupted, provided the secondary data is still valid and in tact. The number of times that the secondary data is used to restore the primary data may be logged, for example, as described above to enable a technician to determine if there is a problem. An example of a subroutine for implementing this "data-fix" feature is provided on pages 353–356 of Microfiche Appendix B.

As described above, access to various levels or modes may require entry of a code or password. By restricting access to these codes or passwords certain classes of individuals may be restricted from accessing certain features or groups of features. An example of a subroutine for implementing this access control in a cooking appliance is provided in pages 357–386 of Microfiche Appendix B.

Timing (e.g. of a cook cycle) may continue through a power down condition. For example, a routine for handling this feature is provided in pages 387–388 of Microfiche Appendix B.

In some instances, left and right are used to described displays and in other instances top and bottom. It is to be understood that his is merely a design preference and the left and top displays may be used interchangeably and the right and bottom displays may be used interchangeably, or vice versa.

The foregoing is a description of the preferred embodiments of the present invention. Various alternatives and modifications will be readily apparent to one of ordinary skill in the art. The invention is only limited by the claims appended hereto.

What is claimed is:

1. A cooking device for cooking food comprising:
   a cavity;
   heating means disposed in the cavity;
   temperature sensing means for determining the temperature in the cooking device;

a fan operable in at least a HI mode and a LO mode to move air in the cooking device; and fan control means responsive to the temperature sensing means for determining in which mode to operate the fan;

wherein the fan control means operates the fan in LO mode by pulsing fan power on for a first predetermined amount of time every second predetermined amount of time to ensure continuous movement of the fan.

2. The cooking device of claim 1 wherein the first predetermined amount of time is about one second and the second predetermined amount of time is about ten seconds.

3. The cooking device of claim 1 wherein the fan control means further turns off power to the fan after the first predetermined period of time.

4. The cooking device of claim 1 wherein the fan control means operates the fan in HI mode when the temperature exceeds a temperature threshold.

5. The cooking device of claim 4 wherein the temperature threshold is about 200° F.

6. The cooking device of claim 4 wherein the fan control means operates the fan in LO mode when the temperature is less than the temperature threshold.

7. The cooking device of claim 4 wherein the fan control means operates the fan in OFF mode by turning the fan on for a third predetermined mount of time every fourth predetermined amount of time.

8. The cooking device of claim 7 wherein the third predetermined amount of time is about ten seconds and the fourth predetermined amount of time is about two minutes.

9. A cooking device for cooking food comprising:

a cavity;

heating means disposed in the cavity;

temperature sensing means for determining the temperature in the cooking device;

a fan operable in at least a HI mode and a LO mode to move air in the cooking device; and fan control means responsive to the temperature sensing means for determining in which mode to operate the fan;

wherein the fan control means operates the fan in LO mode by pulsing the fan on for a first predetermined amount of time every second predetermined amount of time to ensure relatively continuous movement of the fan and further comprising cooking control means for controlling the heating means and wherein the fan moves air to cool the cooking control means.

10. The cooking device of claim 9 wherein the cooking control means are disposed outside of the cavity.

11. A method of operating a fan in a cooking device comprising the steps of:

a) providing a fan in a cooking device;

b) selecting a LO mode of operation for the fan;

c) providing power to the fan on for a first predetermined period of time;

d) removing power from the fan;

e) waiting a second predetermined amount of time; and f) repeating steps c) and e) as long as the LO mode of fan operation is selected;

wherein the second predetermined amount of time is selected to ensure that the fan rotates relatively continuously.

12. The method of claim 11 wherein the first predetermined amount of time is about one second and the second predetermined amount of time is about ten seconds.

* * * * *